US011427685B2

(12) United States Patent
Wu et al.

(10) Patent No.: US 11,427,685 B2
(45) Date of Patent: Aug. 30, 2022

(54) METHOD FOR MAKING SILICONE HYDROGEL CONTACT LENSES

(71) Applicant: Alcon Inc., Fribourg (CH)

(72) Inventors: Daqing Wu, Suwanee, GA (US); Steve Yun Zhang, Sugar Hill, GA (US); Junhao Ge, Johns Creek, GA (US); Richard Charles Breitkopf, Dunwoody, GA (US); Augustine Twum Kumi, Grayson, GA (US); Weihong Lang, Suwanee, GA (US)

(73) Assignee: Alcon Inc., Fribourg (CH)

( * ) Notice: Subject to any disclaimer, the term of this patent is extended or adjusted under 35 U.S.C. 154(b) by 710 days.

(21) Appl. No.: 16/365,973

(22) Filed: Mar. 27, 2019

(65) Prior Publication Data
US 2019/0300654 A1    Oct. 3, 2019

Related U.S. Application Data

(60) Provisional application No. 62/649,216, filed on Mar. 28, 2018.

(51) Int. Cl.
| *B29D 11/00* | (2006.01) |
| *C08G 77/442* | (2006.01) |
| *G02B 1/04* | (2006.01) |
| *B29K 83/00* | (2006.01) |
| *B29K 105/00* | (2006.01) |
| *C08G 77/00* | (2006.01) |

(52) U.S. Cl.
CPC ...... *C08G 77/442* (2013.01); *B29D 11/00067* (2013.01); *B29D 11/00134* (2013.01); *B29D 11/00192* (2013.01); *G02B 1/043* (2013.01); *B29D 11/00038* (2013.01); *B29K 2083/00* (2013.01); *B29K 2105/0061* (2013.01); *C08G 77/70* (2013.01); *C08G 2210/00* (2013.01)

(58) Field of Classification Search
CPC ........ B29D 11/00067; B29D 11/00134; B29D 11/00192; C08G 77/442; G02B 1/043
See application file for complete search history.

(56) References Cited

U.S. PATENT DOCUMENTS

| 4,136,250 A | 1/1979 | Mueller |
| 4,153,641 A | 5/1979 | Deichert et al. |
(Continued)

FOREIGN PATENT DOCUMENTS

EP    0632329 A1    1/1995

OTHER PUBLICATIONS

Kyle C. Heideman and John E. Greivenkamp, Low-coherence interferometer for contact lens surface metrology, Optical Engineering, 55(3), 034106, 2016, pp. 1-12.

*Primary Examiner* — Mathieu D Vargot
(74) *Attorney, Agent, or Firm* — Jian Zhou

(57) ABSTRACT

The invention provides a method for making silicone hydrogel contact lenses. The method of the invention is characterized by using an organic solvent as a processing-aid tool for controlling lens diameter without significantly affecting lens equilibrium water content during cast-molding of soft contact lenses from a polymerizable composition. By adjusting the weight percentage of the organic solvent in a polymerizable composition for making SiHy contact lenses, one can adjust lens diameter of produced SiHy lenses to meet target without affecting adversely the lens properties.

20 Claims, 2 Drawing Sheets

(56) References Cited

U.S. PATENT DOCUMENTS

| | | |
|---|---|---|
| 4,182,822 A | 1/1980 | Chang |
| 4,189,546 A | 2/1980 | Deichert et al. |
| 4,254,248 A | 3/1981 | Friends et al. |
| 4,259,467 A | 3/1981 | Keogh et al. |
| 4,260,725 A | 4/1981 | Keogh et al. |
| 4,261,875 A | 4/1981 | LeBoeuf |
| 4,276,402 A | 6/1981 | Chromecek et al. |
| 4,327,203 A | 4/1982 | Deichert et al. |
| 4,341,889 A | 7/1982 | Deichert et al. |
| 4,343,927 A | 8/1982 | Chang |
| 4,355,147 A | 10/1982 | Deichert et al. |
| 4,444,711 A | 4/1984 | Schad |
| 4,460,534 A | 7/1984 | Boehm et al. |
| 4,486,577 A | 12/1984 | Mueller et al. |
| 4,543,398 A | 9/1985 | Bany et al. |
| 4,605,712 A | 8/1986 | Mueller et al. |
| 4,661,575 A | 4/1987 | Tom |
| 4,684,538 A | 8/1987 | Klemarczyk |
| 4,703,097 A | 10/1987 | Wingler et al. |
| 4,833,218 A | 5/1989 | Lee |
| 4,837,289 A | 6/1989 | Mueller et al. |
| 4,954,586 A | 9/1990 | Toyoshima et al. |
| 4,954,587 A | 9/1990 | Mueller |
| 5,010,141 A | 4/1991 | Mueller |
| 5,034,461 A | 7/1991 | Lai et al. |
| 5,039,761 A | 8/1991 | Ono et al. |
| 5,070,170 A | 12/1991 | Robertson et al. |
| 5,070,215 A | 12/1991 | Bambury et al. |
| 5,079,319 A | 1/1992 | Mueller |
| 5,346,946 A | 9/1994 | Yokoyama et al. |
| 5,358,995 A | 10/1994 | Lai et al. |
| 5,387,632 A | 2/1995 | Lai et al. |
| 5,416,132 A | 5/1995 | Yokoyama et al. |
| 5,449,729 A | 9/1995 | Lai |
| 5,451,617 A | 9/1995 | Lai et al. |
| 5,486,579 A | 1/1996 | Lai et al. |
| 5,736,409 A | 4/1998 | Nunoz |
| 5,760,100 A | 6/1998 | Nicolson et al. |
| 5,843,346 A | 12/1998 | Morrill |
| 5,894,002 A | 4/1999 | Boneberger et al. |
| 5,962,548 A | 10/1999 | Vanderlaan et al. |
| 5,981,675 A | 11/1999 | Valint et al. |
| 6,039,913 A | 3/2000 | Hirt et al. |
| 6,166,236 A | 12/2000 | Bambury |
| 6,762,264 B2 | 7/2004 | Kuenzler et al. |
| 6,867,245 B2 | 3/2005 | Iwata et al. |
| 7,214,809 B2 | 5/2007 | Zanini et al. |
| 7,423,074 B2 | 9/2008 | Lai |
| 7,605,190 B2 | 10/2009 | Moszner et al. |
| 7,915,323 B2 | 3/2011 | Awasthi et al. |
| 8,415,405 B2 | 4/2013 | Maggio |
| 8,420,711 B2 | 4/2013 | Awasthi et al. |
| 8,475,529 B2 | 7/2013 | Clarke |
| 8,529,057 B2 | 9/2013 | Qiu et al. |
| 8,614,261 B2 | 12/2013 | Iwata et al. |
| 8,658,747 B2 | 2/2014 | Liu |
| 8,658,748 B2 | 2/2014 | Liu |
| 8,993,651 B2 | 3/2015 | Chang et al. |
| 9,097,840 B2 | 8/2015 | Chang |
| 9,103,965 B2 | 8/2015 | Chang |
| 9,217,813 B2 | 12/2015 | Liu |
| 9,475,827 B2 | 10/2016 | Chang |
| 10,301,451 B2 | 5/2019 | Jing |
| 10,465,047 B2 | 11/2019 | Jing |
| 2003/0052424 A1 | 3/2003 | Turner |
| 2007/0145616 A1 | 6/2007 | Vanderlaan |
| 2012/0026457 A1 | 2/2012 | Qiu |
| 2012/0088843 A1 | 4/2012 | Chang |
| 2012/0088844 A1 | 4/2012 | Kuyu |
| 2012/0216489 A1 | 8/2012 | Lee |
| 2012/0218509 A1 | 8/2012 | Back |
| 2012/0220688 A1 | 8/2012 | Wang |
| 2012/0220690 A1 | 8/2012 | Liu |
| 2012/0220743 A1 | 8/2012 | Francis |
| 2012/0220744 A1 | 8/2012 | Liu |
| 2012/0244088 A1 | 9/2012 | Saxena |
| 2012/0245249 A1 | 9/2012 | Saxena |
| 2012/0314185 A1* | 12/2012 | Bauman .................. G02B 1/043 351/159.33 |
| 2013/0176530 A1 | 7/2013 | Goodenough |
| 2013/0317132 A1 | 11/2013 | Scales |
| 2014/0018465 A1 | 1/2014 | Liu |
| 2014/0171544 A1 | 6/2014 | Broad |
| 2016/0054475 A1 | 2/2016 | Wang |
| 2017/0166673 A1 | 6/2017 | Huang |
| 2018/0100038 A1 | 4/2018 | Jing |
| 2018/0100053 A1 | 4/2018 | Jing |

\* cited by examiner

METHOD FOR MAKING SILICONE HYDROGEL CONTACT LENSES

This application claims the benefit under 35 USC § 119 (e) of U.S. provisional application No. 62/649,216, filed on 28 Mar. 2018, incorporated by reference in its entirety.

The present invention is related to a method for making silicone hydrogel (SiHy) contact lenses.

BACKGROUND

Soft contact lenses are widely used for correcting many different types of vision deficiencies. Most of soft contact lenses in the market are manufactured by cast-molding. In the cast-molding method, a polymerizable composition (or lens formulation) in a mold is polymerized to obtain a molded polymer article which is in turn extracted and hydrated to form the final hydrated soft contact lens. The molded polymer article has a shape and size similar to the shape of size of the final hydrated soft contact lenses, except that allowance must be made for swelling of the soft contact lens during hydration of the molded polymer article. In order to achieve the prescribed optical correction, soft contact lenses must be designed and then produced to meet demanding dimensional requirements. The dimensions and properties can be varied by changes in polymerization rate or conditions, in the concentrations of polymerizable components in the lens formulation, and in processing conditions. Manufacturers have to establish rigorous quality control programs for lens design process, the quality of raw materials, processing conditions, etc., and to continuously evaluate and revise their operating procedures to minimize the incidences of defective lenses.

Accordingly, there is still a need for a lens manufacturing process according to which soft contact lenses can be produced to have a consistent, targeted lens dimension.

SUMMARY OF THE INVENTION

In accomplishing the foregoing, the present invention provides a method for producing hydrated soft contact lenses. The method comprises the steps of: (1) obtaining a fluid polymerizable composition, wherein the composition comprises polymerizable materials and an organic solvent, wherein the polymerizable materials comprises at least one silicone-containing vinylic monomer or crosslinker and at least one hydrophilic vinylic monomer, wherein the organic solvent has a boiling point of at least 95° C. or higher and is present in the polymerizable composition in an amount of from about 4.0% to about 15% by weight relative to the total amount of the fluid polymerizable composition and is capable of functioning as a processing-aid tool for controlling lens diameter of a hydrated soft contact lens made from the polymerizable composition; (2) introducing the fluid polymerizable composition into a cavity formed by a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; (3) curing thermally or actinically the fluid polymerizable composition in the mold to form a dry contact lens; (4) extracting the dry contact lens with a liquid extraction medium to remove the organic solvent, unpolymerized polymerizable components and oligomers from the dry lens to obtain an extracted contact lens; (5) hydrating the extracted contact lens with water or an aqueous solution to obtain the hydrated soft contact lens, wherein the amount of the organic solvent is adjusted to achieve a targeted lens diameter of the hydrated soft contact lens without causing a change of about 1.7% or less in equilibrium water content.

DETAILED DESCRIPTION OF EMBODIMENTS OF THE INVENTION

Figure 1:
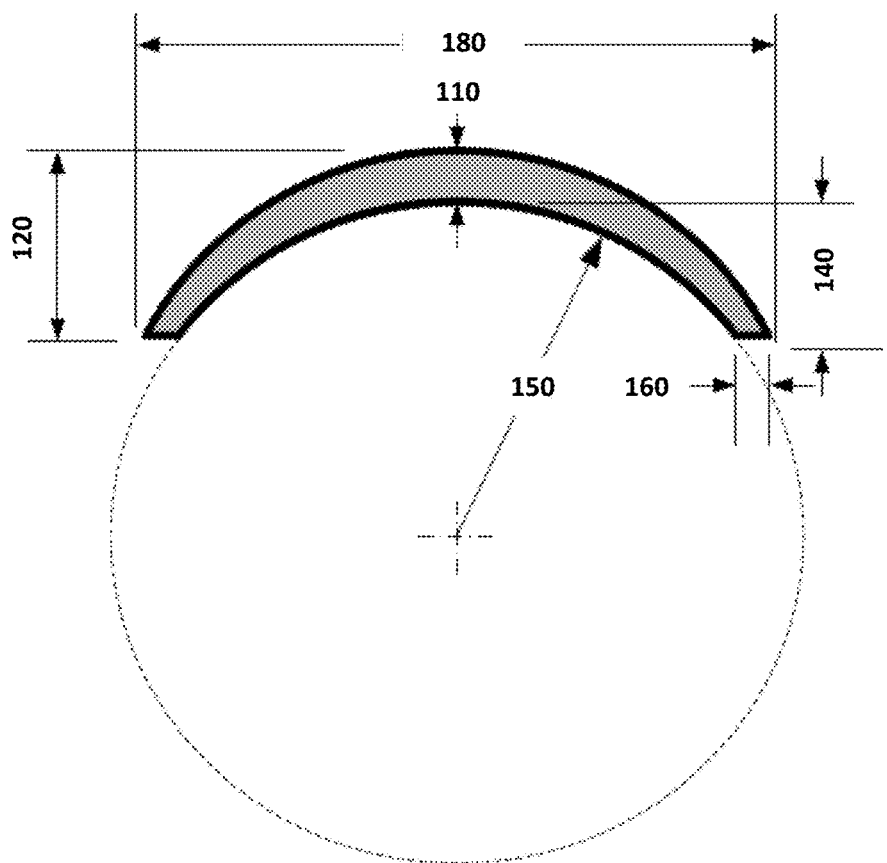
FIG. 1 illustrates the general dimensions of a contact lens.
Figure 2:
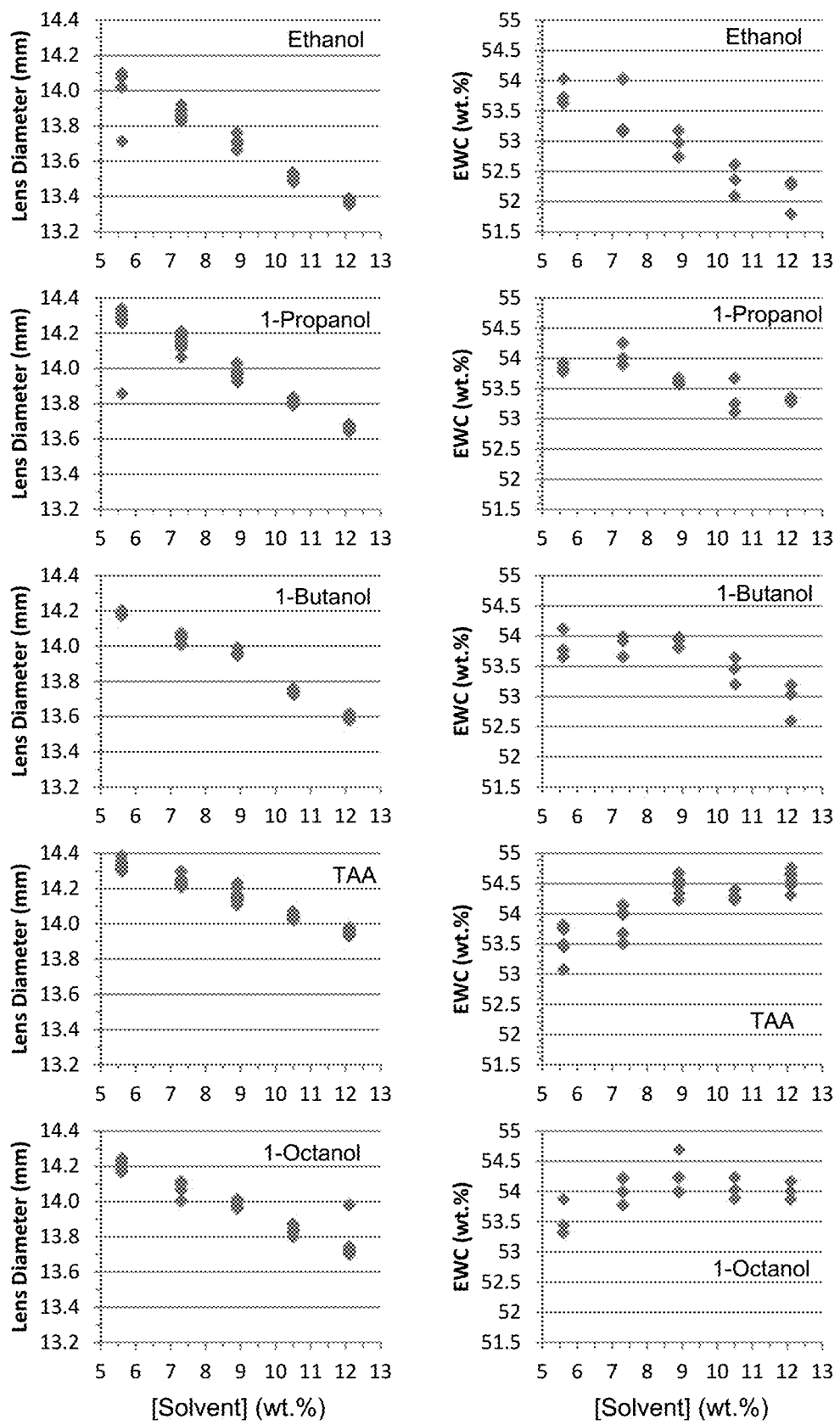
FIG. 2 shows the changes of lens diameter and equilibrium water content as function of solvent concentration (weight percent).

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art. Also, as used in the specification including the appended claims, reference to singular forms such as "a," "an," and "the" include the plural, and reference to a particular numerical value includes at least that particular value, unless the context clearly dictates otherwise. "About" as used herein means that a number referred to as "about" comprises the recited number plus or minus 1-10% of that recited number.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" or "SiHy contact lens" refers to a contact lens comprising a silicone hydrogel bulk (core) material.

A "soft contact lens" refers to a contact lens which has an elastic modulus (i.e., Young's modulus) of less than 2.5 MPa.

A "hydrogel" or "hydrogel material" refers to a crosslinked polymeric material which has three-dimensional polymer networks (i.e., polymer matrix), is insoluble in water, but can hold at least 10 percent by weight of water in its polymer matrix when it is fully hydrated.

A "silicone hydrogel" or "SiHy" refers to a silicone-containing hydrogel obtained by copolymerization of a polymerizable composition comprising at least one silicone-containing monomer or at least one silicone-containing macromer or at least one crosslinkable silicone-containing prepolymer.

As used in this application, the term "non-silicone hydrogel" refers to a hydrogel that is theoretically free of silicon.

"Hydrophilic," as used herein, describes a material or portion thereof that will more readily associate with water than with lipids.

A "vinylic monomer" refers to a compound that has one sole ethylenically unsaturated group, is soluble in a solvent, and can be polymerized actinically or thermally.

The term "room temperature" refers to a temperature of about 21° C. to about 27° C.

The term "soluble", in reference to a compound or material in a solvent, means that the compound or material can be dissolved in the solvent to give a solution with a concentration of at least about 0.02% by weight at room temperature.

The term "insoluble", in reference to a compound or material in a solvent, means that the compound or material can be dissolved in the solvent to give a solution with a concentration of less than 0.005% by weight at room temperature.

As used in this application, the term "ethylenically unsaturated group" is employed herein in a broad sense and is intended to encompass any groups containing at least one >C=C< group. Exemplary ethylenically unsaturated groups include without limitation (meth)acryloyl

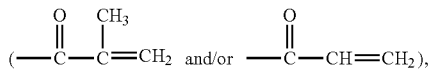

allyl, vinyl, styrenyl, or other C=C containing groups.

The term "terminal (meth)acryloyl group" refers to one (meth)acryloyl group at one of the two ends of the main chain (or backbone) of an organic compound as known to a person skilled in the art.

The term "(meth)acrylamide" refers to methacrylamide and/or acrylamide.

The term "(meth)acrylate" refers to methacrylate and/or acrylate.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

A "hydrophilic vinylic monomer", as used herein, refers to a vinylic monomer which as a homopolymer typically yields a polymer that is water-soluble or can absorb at least 10 percent by weight of water.

A "hydrophobic vinylic monomer", as used herein, refers to a vinylic monomer which as a homopolymer typically yields a polymer that is insoluble in water and can absorb less than 10 percent by weight of water.

A "primary-amino-containing vinylic monomer" refers to a vinylic monomer having an amino group of —NH$_2$.

A "blending vinylic monomer" refers to a vinylic monomer capable of dissolving both hydrophilic and hydrophobic components of a polymerizable composition to form a solution.

An "acrylic monomer" means a vinylic monomer having one sole (meth)acryloyl group.

An "N-vinyl amide monomer" refers to an amide compound having a vinyl group (—CH=CH$_2$) that is directly attached to the nitrogen atom of the amide group.

A "macromer" or "prepolymer" refers to a compound or polymer that is soluble in a solvent, contains ethylenically unsaturated groups, and has a number average molecular weight of greater than 700 Daltons.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

As used in this application, the term "polymer" means a material formed by polymerizing one or more monomers or macromers or prepolymers or combinations thereof.

As used in this application, the term "molecular weight" of a polymeric material (including monomeric or macromeric materials) refers to the number average molecular weight unless otherwise specifically noted or unless testing conditions indicate otherwise.

A "polysiloxane segment" refers to a polymer chain consisting of at least three consecutively- and directly-linked siloxane units (divalent radical) each independent of one another having a formula of

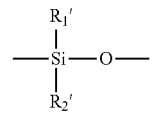

in which $R_1'$ and $R_2'$ are two substituents independently selected from the group consisting of $C_1$-$C_{10}$ alkyl, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, -alk-(OC$_2$-H$_4$)$_{\gamma1}$—OR$^o$ (in which alk is $C_1$-$C_6$ alkyl diradical, R$^o$ is H or $C_1$-$C_4$ alkyl and $\gamma1$ is an integer from 1 to 10), a $C_2$-$C_{40}$ organic radical having at least one functional group selected from the group consisting of hydroxyl group (—OH), carboxyl group (—COOH), —NR$_3$'R$_4$', amino linkages of —NR$_3$'—, amide linkages of —CONR$_3$'—, amide of —CONR$_3$'R$_4$', urethane linkages of —OCONH—, and $C_1$-$C_4$ alkoxy group, or a linear hydrophilic polymer chain, in which R$_3$' and R$_4$' independent of each other are hydrogen or a $C_1$-$C_{15}$ alkyl.

A "polysiloxane vinylic crosslinker" refers to a compound comprising at least one polysiloxane segment and at least two ethylenically-unsaturated groups.

A "linear polysiloxane vinylic crosslinker" refers to a compound comprising a main chain which includes at least one polysiloxane segment and is terminated with one ethylenically-unsaturated group at each of the two ends of the main chain.

A "chain-extended polysiloxane vinylic crosslinker" refers to a compound comprising at least two ethylenically-unsaturated groups and at least two polysiloxane segments each pair of which is linked by one divalent radical.

A "polycarbosiloxane" refers to a compound containing at least one polycarbosiloxane segment which is a polymer chain consisting of at least three consecutively- and directly-linked siloxane units (divalent radical) each independent of one another having a formula of

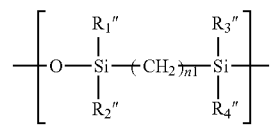

in which n1 is an integer of 2 or 3, $R_1''$, $R_2''$, $R_3''$, and $R_4''$ independent of one another are a $C_1$-$C_6$ alkyl radical (preferably methyl).

A "polycarbosiloxane vinylic monomer" refers to a compound comprising at least one polycarbosiloxane segment and one sole ethylenically-unsaturated group.

A "polycarbosiloxane vinylic crosslinker" refers to a compound comprising at least one polycarbosiloxane segment and at least two ethylenically-unsaturated groups.

The term "fluid" means that a material is capable of flowing like a liquid.

As used in this application, the term "clear" in reference to a polymerizable composition means that the polymerizable composition is a transparent solution or liquid mixture (i.e., having a light transmissibility of 85% or greater, preferably 90% or greater in the range between 400 to 700 nm).

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxyl (—OH), carboxyl (—COOH), —NH$_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

As used in this application, the term "phosphorylcholine" refers to a zwitterionic group of

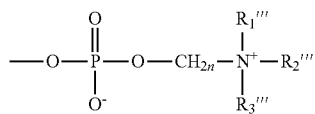

in which n is an integer of 1 to 5 and $R_1'''$, $R_2'''$ and $R_3'''$ independently of each other are $C_1$-$C_8$ alkyl or $C_1$-$C_8$ hydroxyalkyl.

In general, the invention is directed to a method for producing SiHy contact lenses. A method of the invention is characterized by using an organic solvent as a processing-aid tool for controlling lens diameter without significantly affecting lens equilibrium water content during cast-molding of soft contact lenses from a polymerizable composition. The invention is partly based on the discovery that when an organic solvent having a boiling point of at least 90° C. or higher (e.g., a $C_3$-$C_8$ alkyl alcohol) is used as a diluent in a polymerizable composition for cast molding SiHy contact lenses, the lens diameter of the fully-hydrated resultant contact lenses decreases, whereas their equilibrium water content remains substantially constant, as the weight percentage of that organic solvent increases within a range of from about 4.0% to about 15% by weight relative to the total weight of the polymerizable composition. By adjusting the weight percentage of the organic solvent in a polymerizable composition for making SiHy contact lenses, one can adjust lens diameter of produced SiHy lenses to meet target without affecting adversely the lens properties, e.g., equilibrium water content. The advantages of the invention are to easily control lens diameter in mass production of SiHy contact lenses, to enhance raw material specification or storage tolerance (e.g., vinylic monomers, vinylic crosslinkers, etc.), and thereby to lower the product cost.

The present invention provides a method for producing contact lenses. The method comprises the steps of: (1) obtaining a fluid polymerizable composition, wherein the composition comprises an organic solvent and dissolved therein polymerizable materials, wherein the polymerizable materials comprises at least one silicone-containing vinylic monomer or crosslinker and at least one hydrophilic vinylic monomer, wherein the organic solvent has a boiling point of at least 95° C. or higher (preferably at least 100° C. or higher, more preferably at least 105° C. or higher, even more preferably at least 110° C. or higher) and is present in the polymerizable composition in an amount of from about 4% to about 15% (preferably from about 5.0% to about 12.5%, more preferably from about 5.5% to about 11%, even more preferably from about 5.5% to about 9.5%) by weight relative to the total amount of the fluid polymerizable composition and is capable of functioning as a processing-aid tool for controlling lens diameter of a hydrated soft contact lens made from the polymerizable composition; (2) introducing the fluid polymerizable composition into a cavity formed by a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; (3) curing thermally or actinically (preferably, curing thermally) the fluid polymerizable composition in the mold to form a dry contact lens; (4) extracting the dry contact lens with a liquid extraction medium to remove the organic solvent, unpolymerized polymerizable components and oligomers from the dry lens to obtain an extracted contact lens; and (5) hydrating the extracted contact lens with water or an aqueous solution to obtain the hydrated soft contact lens, wherein the amount of the organic solvent in the polymerizable composition is adjusted to achieve a targeted lens diameter of the hydrated soft contact lens without affecting adversely the equilibrium water content of the hydrated soft contact lens.

The term "dry contact lens" refers to a molded contact lens which has not been subjected to extraction and hydration processes.

The term "organic solvent" refers to an organic compound that cannot participate in free-radical polymerization reaction.

In accordance with a preferred embodiment of the invention, the organic solvent is a $C_3$-$C_8$ alkyl alcohol, preferably a $C_4$-$C_8$ alkyl alcohol, more preferably a $C_4$-$C_6$ alkyl alcohol.

Polymerizable materials (or lens-forming materials) for making contact lenses are well known to a person skilled in the art and are disclosed in numerous patents.

In accordance with the invention, a silicone-containing vinylic monomer can be any silicone-containing vinylic monomer known to a person skilled in the art. Examples of preferred silicone-containing vinylic monomers include without limitation vinylic monomers each having a bis(trialkylsilyloxy)alkylsilyl group or a tris(trialkylsilyloxy)silyl group, polysiloxane vinylic monomers, polycarbosiloxane vinylic monomer, 3-methacryloxypropylpentamethyldisiloxane, t-butyldimethyl-siloxyethyl vinyl carbonate, trimethylsilylethyl vinyl carbonate, and trimethylsilylmethyl vinyl carbonate, and combinations thereof.

In a preferred embodiment, the silicone-containing vinylic monomer is a siloxane-containing vinylic monomer of formula (M1) or (M2)

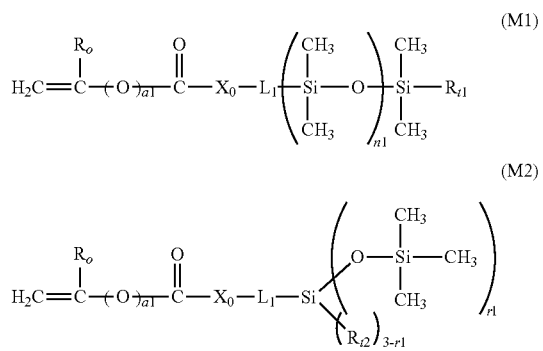

in which: a1 is zero or 1; $R_o$ is H or methyl; $X_o$ is O or $NR_1$; $L_1$ is a $C_2$-$C_8$ alkylene divalent radical or a divalent radical of -$L_1$'-$X_1$-$L_1$"-, —($C_2H_4O$)$_{q1}$-$L_1$"-, —($C_2H_4O$)$_{q1}$—CONH-$L_1$"-, -$L_1$'-NHCOO—($C_2H_4O$)$_{q1}$-$L_1$"-, —$CH_2$—CH(OH)—$CH_2$—$X_1$'—($C_2H_4O$)$_{q2}$-$L_1$"-, -$L_1$'-$X_1$'—$CH_2$—CH(OH)—$CH_2$—O-$L_1$"-, or —($C_2H_4O$)$_{q1}$—$CH_2$—CH(OH)—$CH_2$—O-$L_1$"-; $L_1$' is a $C_2$-$C_8$ alkylene divalent radical which has zero or one hydroxyl group; $L_1$" is $C_3$-$C_8$ alkylene divalent radical which has zero or one hydroxyl group; $X_1$ is O, $NR_1$, NHCOO, OCONH, $CONR_1$, or $NR_1CO$; $R_1$ is H or a $C_1$-$C_4$ alkyl having 0 to 2 hydroxyl group; $R_{f1}$ and $R_{f2}$ independent of each other are a $C_1$-$C_4$ alkyl; $X_1$' is O or $NR_1$; q1 is an integer of 1 to 20; q2 is an integer of 0 to 20; n1 is an integer of 3 to 25; and r1 is an integer of 2 or 3.

Examples of preferred siloxane-containing vinylic monomers of formula (M1) include without limitation α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxy-propyloxy-2-hydroxypropyloxypropyl]-terminated ω-$C_1$-$C_4$-alkyl terminated polydimethylsiloxane, α-[3-(meth)acryloxyisopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω-$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[3-(meth)acryloxy-butylamino-2-hydroxypropyloxypropyl]-terminated ω-$C_1$-$C_4$-alkyl terminated polydimethylsiloxane, α-(meth)acryloxy(polyethylenoxy)-2-hydroxypropyloxypropyl]-terminated ω-$C_1$-$C_4$-alkyl terminated polydimethylsiloxane, α-[(meth)acryloxy-2-hydroxypropyloxy-ethoxypropyl]-terminated ω-$C_1$-$C_4$-alkyl terminated polydimethylsiloxane, α-[(meth)acryloxy-2-hydroxypropyl-N-ethylaminopropyl]-terminated ω-$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy)propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxy-propyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl] terminated ω-$C_1$-$C_4$-alkyl polydimethylsiloxane, α-[3-[N-methyl-(meth)acryloylamido]-2-hydroxypropyloxypropyl] terminated ω-$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy) dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, hydrophilized siloxane-containing (meth) acrylamides disclosed in U.S. Pat. No. 9,097,840, hydrophilized siloxane-containing acrylic monomers disclosed in U.S. Pat. No. 9,103,965, and mixtures thereof. The above preferred polysiloxanes vinylic monomers of formula (M1) can be obtained from commercial suppliers (e.g., Shin-Etsu, Gelest, etc.) or prepared according to procedures described in patents, e.g., U.S. Pat. Nos. 5,070,215, 6,166,236, 6,867, 245, 8,415,405, 8,475,529, 8,614,261, 9,097,840, 9,103,965, and 9,217,813, or by reacting a hydroxyalkyl (meth)acrylate or (meth)acrylamide or a (meth)acryloxypolyethylene glycol with a mono-epoxypropyloxypropyl-terminated polydimethylsiloxane, by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane, or by reacting isocyanatoethyl (meth)acrylate with a mono-carbinol-terminated polydimethylsiloxane according to coupling reactions well known to a person skilled in the art.

Examples of preferred siloxane-containing vinylic monomers of formula (M2) include without limitation tris(trimethylsilyloxy)silylpropyl (meth)acrylate, [3-(meth)acryloxy-2-hydroxypropyloxy]propylbis(trimethylsiloxy) methylsilane, [3-(meth)acryloxy-2-hydroxypropyloxy] propylbis(trimethylsiloxy)butylsilane, 3-(meth)acryloxy-2-(2-hydroxyethoxy)-propyloxy)propylbis(trimethylsiloxy) methylsilane, 3-(meth)acryloxy-2-hydroxypropyloxy)-propyltris(trimethylsiloxy)silane, N-[tris(trimethylsiloxy)silylpropyl]-(meth)acrylamide, N-(2-hydroxy-3-(3-(bis(trimethylsilyloxy) methylsilyl)propyloxy)propyl)-2-methyl (meth)acrylamide, N-(2-hydroxy-3-(3-(bis(trimethylsilyloxy)methylsilyl)propyloxy)propyl) (meth)acrylamide, N-(2-hydroxy-3-(3-(tris(trimethylsilyloxy)silyl)propyloxy) propyl)-2-methyl acrylamide, N-(2-hydroxy-3-(3-(tris(trimethylsilyloxy)silyl)propyloxy)propyl) (meth)acrylamide, N-[tris(dimethylpropylsiloxy)-silylpropyl]-(meth)acrylamide, N-[tris(dimethylphenylsiloxy)silylpropyl] (meth)acrylamide, N-[tris(dimethylethylsiloxy)silylpropyl] (meth)acrylamide, N,N-bis[2-hydroxy-3-(3-(bis(trimethylsilyloxy)methylsilyl)propyloxy)propyl]-2-methyl (meth)acrylamide, N,N-bis[2-hydroxy-3-(3-(bis(trimethylsilyloxy)methylsilyl)propyloxy)propyl] (meth)acrylamide, N,N-bis[2-hydroxy-3-(3-(tris(trimethylsilyloxy)silyl)propyloxy)propyl]-2-methyl (meth)acrylamide, N,N-bis[2-hydroxy-3-(3-(tris(trimethylsilyloxy)silyl)propyloxy)propyl] (meth)acrylamide, N-[2-hydroxy-3-(3-(t-butyldimethylsilyl)oxy)propyl]-2-methyl (meth)acrylamide, N-[2-hydroxy-3-(3-(t-butyldimethylsilyl)propyloxy)propyl] (meth)acrylamide, N,N-bis[2-hydroxy-3-(3-(t-butyldimethylsilyl) propyloxy)propyl]-2-methyl (meth)acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio) propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, those disclosed in U.S. Pat. Nos. 9,097,840, 9,103,965 and 9,475,827, and mixtures thereof. The above preferred silicone-containing vinylic monomers can be obtained from commercial suppliers or can be prepared according to procedures described in U.S. Pat. Nos. 5,070,215, 6,166,236, 7,214,809, 8,475,529, 8,658,748, 9,097,840, 9,103,965, and 9,475,827.

Any polycarbosiloxane vinylic monomers can be used in the invention. Examples of preferred polycarbosiloxane vinylic monomers include without limitation those disclosed in U.S. Pat. Nos. 7,915,323 and 8,420,711 and in U.S. Pat. Appl. Pub. Nos. 2012/244088A1 and 2012/245249A1.

Any silicone-containing vinylic crosslinkers can be used in the invention. Examples of preferred silicone-containing vinylic crosslinkers include without limitation polysiloxane vinylic crosslinkers, polycarbosiloxane vinylic crosslinkers, and combinations thereof.

Any polysiloxane vinylic crosslinkers can be used in the invention. Examples of preferred polysiloxane vinylic crosslinkers are di-(meth)acryloyl-terminated polydimethylsiloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264; polysiloxane-containing macromers disclosed in U.S. Pat. Nos. 4,259,467, 4,260,725, and 4,261,875.

One class of preferred polysiloxane vinylic crosslinkers are di-(meth)acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups as disclosed in U.S. Pat. App. Pub. No. 2017/0166673 A1, more preferably a polysiloxane vinylic crosslinker of formula (I)

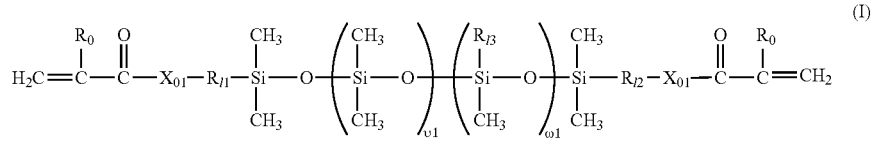

in which:

$\upsilon 1$ is an integer of from 30 to 500 and $\omega 1$ is an integer of from 1 to 75, provided that $\omega 1/\upsilon 1$ is from about 0.035 to about 0.15 (preferably from about 0.040 to about 0.12, even more preferably from about 0.045 to about 0.10);

$X_{01}$ is O or $NR_N$ in which $R_N$ is hydrogen or $C_1$-$C_{10}$-alkyl;

$R_o$ is hydrogen or methyl;

$R_{I1}$ and $R_{I2}$ independently of each other are a substituted or unsubstituted $C_1$-$C_{10}$ alkylene divalent radical or a divalent radical of $-R_{I4}-O-R_{I5}-$ in which $R_{I4}$ and $R_{I5}$ independently of each other are a substituted or unsubstituted $C_1$-$C_{10}$ alkylene divalent radical;

$R_{I3}$ is a monovalent radical of any one of formula (Ia) to (Ie)

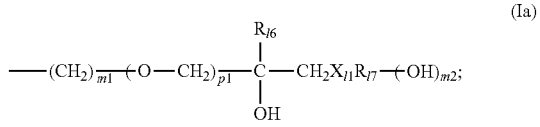

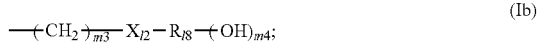

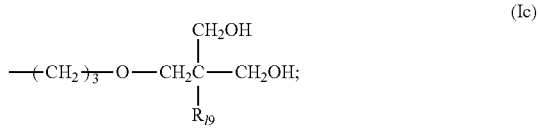

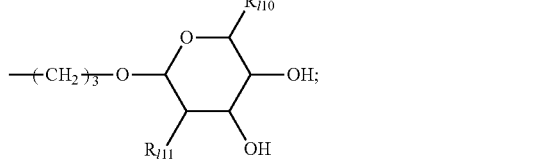

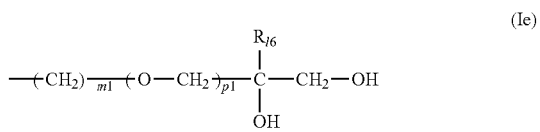

in which: p1 is zero or 1; m1 is an integer of 2 to 4; m2 is an integer of 1 to 5; m3 is an integer of 3 to 6; m4 is an integer of 2 to 5; $R_{I6}$ is hydrogen or methyl; $R_{I7}$ is a $C_2$-$C_6$ hydrocarbon radical having (m2+1) valencies; $R_{I8}$ is a $C_2$-$C_6$ hydrocarbon radical having (m4+1) valencies; $R_{I9}$ is ethyl or hydroxymethyl; $R_{I10}$ is methyl or hydromethyl; $R_{I11}$ is hydroxyl or methoxy; $X_{I1}$ is a sulfur linkage of $-S-$ or a teriary amino linkage of $-NR_{I12}-$ in which $R_{I12}$ is $C_1$-$C_1$ alkyl, hydroxyethyl, hydroxypropyl, or 2,3-dihydroxypropyl; and $X_{I2}$ is an amide linkage of

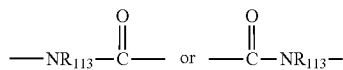

in which $R_{f13}$ is hydrogen or $C_1$-$C_{10}$ alkyl.

A polysiloxane vinylic crosslinker of formula (I) can be prepared according to procedures described in U.S. Pat. Appl. Pub. No. 20120088843A1.

Other classes of preferred polysiloxane vinylic crosslinkers are vinylic crosslinkers of any one of formula (1) to (7)

≥1; $R_o$ is H or methyl; $R_1$, $R_{1n}$, $R_{2n}$, $R_{3n}$, and $R_{4n}$ independent of one another are H or a $C_1$-$C_4$ alkyl having 0 to 2 hydroxyl group; $R_{n5}$ is H or a $C_1$-$C_{10}$ alkyl; $R_2$ is a $C_4$-$C_{14}$ hydrocarbon divalent radical; $R_3$ is a $C_2$-$C_6$ alkylene divalent radical; $R_4$ and $R_5$ independent of each other are a $C_1$-$C_6$ alkylene divalent radical or a $C_1$-$C_6$ alkylene-oxy-$C_1$-$C_6$ alkylene divalent radical; $R_6$ and $R_7$ independent of each other are a $C_1$-$C_6$ alkylene divalent radical or a $C_1$-$C_6$ alkoxy-$C_1$-$C_6$ alkylene divalent radical; $R_8$ and $R_9$ independent of each other are a substituted or unsubstituted $C_1$-$C_{12}$ alkylene divalent radical; $X_o$, $X_1'$, $X_{o1}$, $X_{o2}$, and $X_{03}$ independent of one another are O or $NR_1$; $X_1$ is O, $NR_1$,

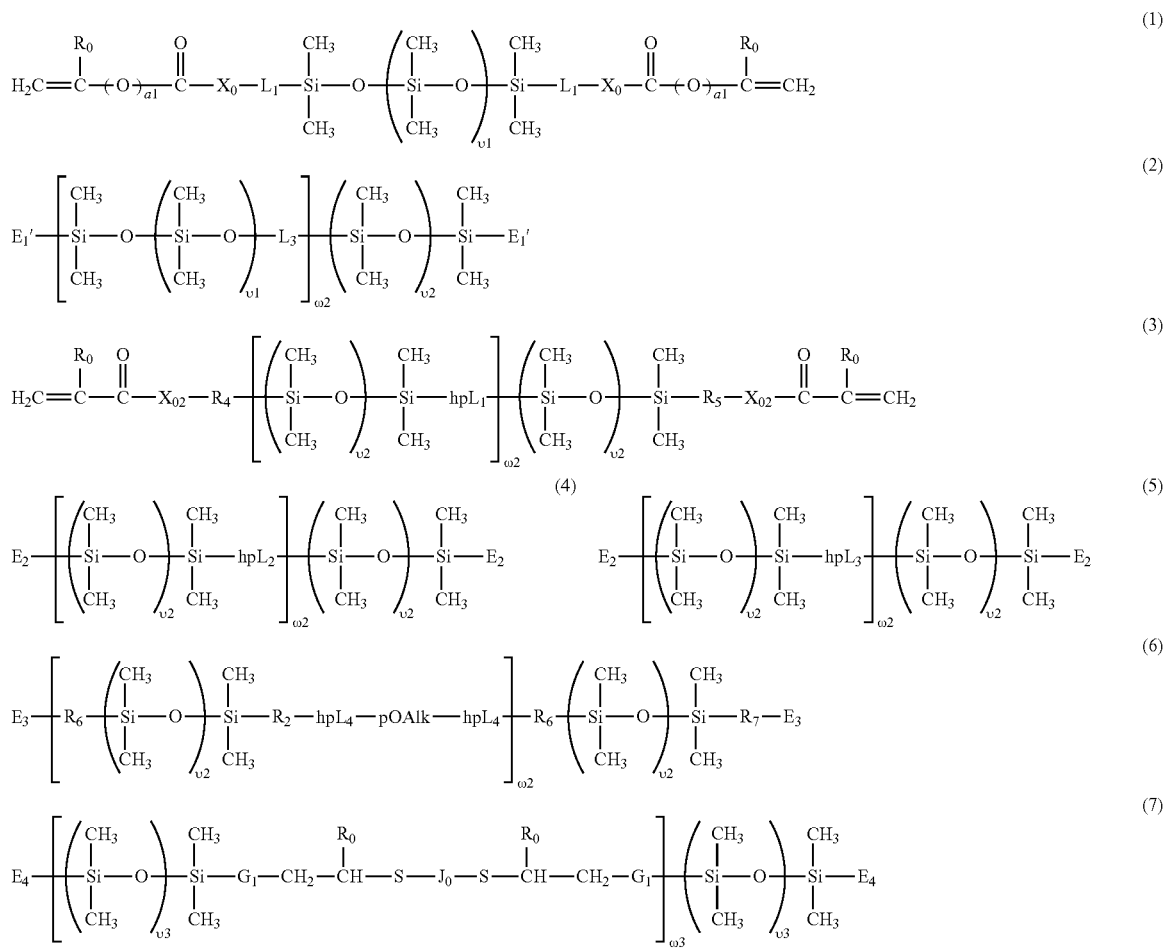

in which: υ1 is an integer of from 30 to 500; υ2 is an integer of from 5 to 50; υ3 is an integer of from 5 to 100; ω2 and ω3 independent of each other are an integer of from 1 to 15; a1 and g1 independent of each other is zero or 1; h1 is an integer of 1 to 20 and h2 is an integer of 0 to 20; m1 and m3 independent of each other is 0 or 1, m2 is an integer of 1 to 6, m4 is an integer of 1 to 5, m5 is 2 or 3; q1 is an integer of 1 to 20, q2 is an integer of 0 to 20, q3 is an integer of 0 to 2, q4 is an integer of 2 to 50, q5 and q6 independent of each other are a number of 0 to 35, provided that (q4+q5+q6) is an integer of 2 to 50; x+y is an integer of from 10 to 30; e1 is an integer of 5 to 100, p1 and b1 independent of each other are an integer of 0 to 50, provided that (e1+p1+b1)≥10 and e1/(p1+b1)≥2 (preferably from about 2:1 to about 10:1, more preferably from about 3:1 to about 6:1) when (p1+b1)

NHCOO, OCONH, $CONR_1$, or $NR_1CO$; $X_{o4}$ is —COO— or —$CONR_{n5}$—; $X_{o5}$ and $X_{o7}$ independent of each other are a direct bond, —COO— or —$CONR_{n5}$—; $X_{o6}$ is a direct bond, a $C_1$-$C_6$ alkylene divalent radical, a $C_1$-$C_6$ alkylenoxy divalent radical, —COO—, or —$CONR_{n5}$—; $X_{o8}$ is a direct bond or —COO—; $X_{o9}$ is O or $NR_{n5}$; $X_{10}$ is a direct bond, a $C_1$-$C_6$ alkylene divalent radical, —COO—, or —$CONR_{n5}$—; $E_1'$ is a monovalent radical of

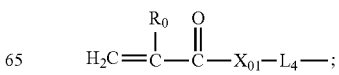

$E_2$ is a monovalent radical of

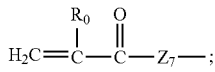

$E_3$ is a monovalent radical of

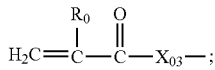

$E_4$ is a monovalent radical of

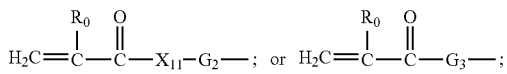

$L_1$ is a $C_2$-$C_8$ alkylene divalent radical or a divalent radical of -$L_1$'-$X_1$-$L_1$"-, $-(C_2H_4O)_{q1}$-$L_1$"-, $-(C_2H_4O)_{q1}$—CONH-$L_1$"-, -$L_1$'-NHCOO-$(C_2H_4O)_{q1}$-$L_1$"-, —$CH_2$—CH(OH)—$CH_2$—$X_1$'-$(C_2H_4O)_{q1}$-$L_1$"-, -$L_1$'-$X_1$'—$CH_2$—CH(OH)—$CH_2$—O-$L_1$"-, or $-(C_2H_4O)_{q1}$—$CH_2$—CH(OH)—$CH_2$—O-$L_1$"-; $L_1$' is a $C_2$-$C_8$ alkylene divalent radical which has zero or one hydroxyl group; $L_1$" is $C_3$-$C_8$ alkylene divalent radical which has zero or one hydroxyl group; $L_3$ is a divalent radical of -$L_3$'-O-$(C_2H_4O)_{q2}$—CONH—$R_2$-$(NHCO$-PE-CONH—$R_2)_{g1}$—NHCO—($OC_2H_4)_{q2}$—O-$L_3$'— in which PE is a divalent radical of $-(CH_2CH_2O)_{q3}$—$Z_0$.$CF_2$-$(OCF_2)_x$-$OCF_2CF_2)_y$—$OCF_2$—$Z_0$-$(OCH_2CH_2)_{q3}$— or

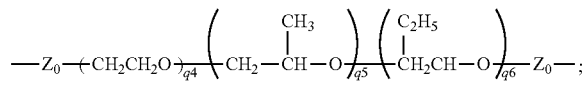

$L_3$' is $C_3$-$C_8$ alkylene divalent radical; $L_4$ is a divalent radical of —$C_2H_4$—NHCO—O-$(C_2H_4)_{q2}$-$L_3$'-, $-(C_2H_4$-O$)_{q1}$—CONH—$R_2$—NHCO—O-$(C_2H_4O)_{q2}$-$L_3$'-, —$R_3$—O—CONH—$R_2$—NHCO—O-$(C_2H_4O)_{q2}$-$L_3$'-, —$CH_2$—CH(OH)—$CH_2$—O-$(C_2H_4O)_{q2}$-$L_3$'-, or $-(C_2H_4O)_{q2}$-$L_3$'-; $hpL_1$ is a divalent radical of

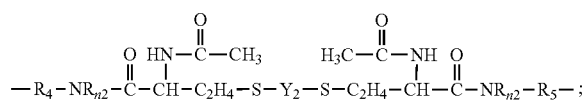

$hpL_2$ is a divalent radical of

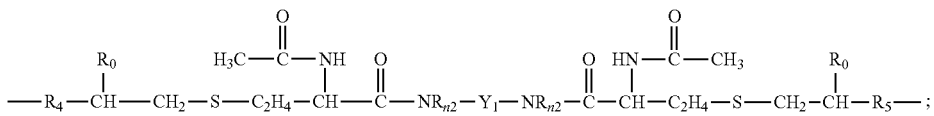

$hpL_3$ is a divalent radical of

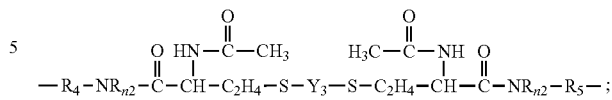

$hpL_4$ is a divalent radical of

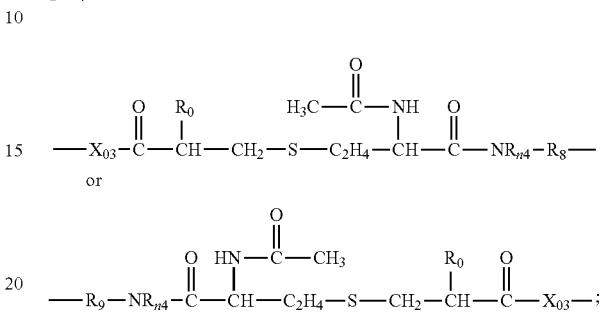

pOAlk is a divalent radical of $-(EO)_{e1}(PO)_{p1}(BO)_{b1}$ in which EO is an oxyethylene unit (—$CH_2CH_2O$—), PO is an oxypropylene unit

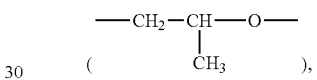

and BO is an oxybutylene unit

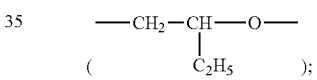

$M_0$ is $C_3$-$C_8$ alkylene divalent radical; $M_1$ is a $C_4$-$C_{14}$ hydrocarbon divalent radical; $M_2$ and $M_3$ independent of each other are a $C_1$-$C_6$ alkylene divalent radical; $J_0$ is a $C_1$-$C_{12}$ hydrocarbon radical having 0 to 2 hydroxyl or carboxyl groups; G1 is a direct bond, a $C_1$-$C_4$ alkylene divalent radical, or a bivalent radical of —$X_{04}$-$(C_2H_4)_{h1}$—CONH-$M_1$-NHCO—O-$(C_2H_4O)_{h2}$-$M_0$-, —$X_{05}$-$M_2$-O—CONH-$M_1$-NHCO—O-$(C_2H_4O)_{h2}$-$M_0$-, —$X_{06}$—$CH_2$—CH(OH)—$CH_2$—O-$(C_2H_4O)_{h2}$-$M_0$-, —$X_{07}$-$(C_2H_4O)_{h2}M_0$-; —$X_{08}$-$M_3$-NHCOO-$(C_2H_4O)_{h1}$-$M_0$-, —$X_{10}$—$CH_2$—CH(OH)—$CH_2$—$X_{09}$—($C_2H_4O)_{h2}M_0$-, —$X_{07}$-$M_3$-$X_{09}$—$CH_2$—CH(OH)—$CH_2$—O-$M_0$-, or —$X_{08}$-$(C_2H_4O)_{h1}$—$CH_2$—CH(OH)—$CH_2$—O-$M_0$- in which $M_0$ is linked to Si atom while $X_{04}$ to $X_{10}$ are linked to the group of —$CH_2$— in formula (7) and at least one of $J_0$ and G1 in formula (7) comprises at least one moieties selected from the group consisting of hydroxyl groups, urethane linkage of —OCONH—, amino groups of —$NHR^o$, amino linkages of —NH—, amide linkages of —CONH—, carboxyl groups, and combinations thereof; $G_2$ is a $C_1$-$C_4$ alkylene divalent radical or a bivalent radical of —(C₂H₄O)$_{h1}$—CONH-M₁-NHCO—O—(C₂H₄O)—M₀-,
-M₂-O—CONH-M₁-NHCO—O—(C₂H₄O)$_{h2}$-M₀-,
—CH₂—CH(OH)—CH₂—O—(C₂H₄O)$_{h2}$-M₀-,
—(C₂H₄O)$_{h2}$-M₀-; -M₃-NHCOO—(C₂H₄O)$_{h1}$-M₀-,
—CH₂—CH(OH)—CH₂—X$_{09}$—(C₂H₄O)$_{h2}$-M₀-, -M₃-X$_{09}$—CH₂—CH(OH)—CH₂—O-M₀-, or —(C₂H₄O)$_{h1}$—CH₂CH(OH)—CH₂—O-M₀-; G₃ is a divalent radical of

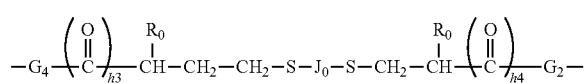

in which h3 and h4 independent of each other are 1 or 0; G4 is a divalent radical of any one of (a) —NR₃'— in which R₃' is hydrogen or C₁-C₃ alkyl, (b)

(c) —NR₀-G₅-NR₀— in which G₅ is a C₁-C₆ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, and (d) —O-G₆-O— in which G₆ is a C₁-C₆ alkylene divalent radical, a divalent radical of

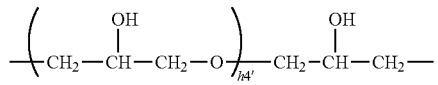

in which h4' is 1 or 2, a divalent radical of

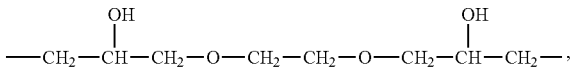

a divalent radical of

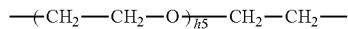

in which h5 is an integer of 1 to 5, a divalent radical of

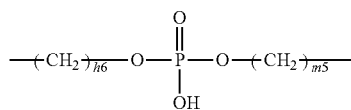

in which h6 is 2 or 3, or a substituted C₃-C₈ alkylene divalent radical having a hydroxyl group or phosphonyloxy group; Y₁ is a C₁-C₆ alkylene divalent radical, 2-hydroxylpropylene divalent radical, 2-(phosphonyloxy)propylene divalent radical, 1,2-dihydroxyethylene divalent radical, a divalent radical of

or a divalent radical of

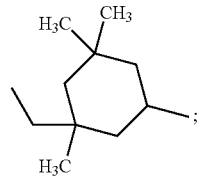

Y₂ is a divalent radical of

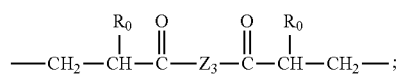

Y₃ is a divalent radical of

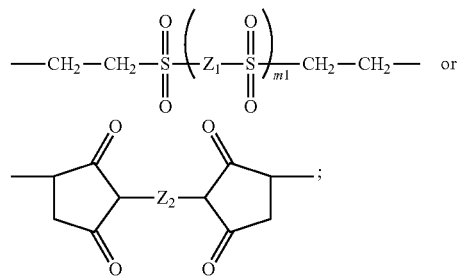

Z₀ is a direct bond or a C₁-C₁₂ alkylene divalent radical; Z₁ is a C₁-C₆ alkylene divalent radical, a hydroxyl- or methoxy-substituted C₁-C₆ alkylene divalent radical, or a substituted or unsubstituted phenylene divalent radical, Z₂ is a C₁-C₆ alkylene divalent radical, a hydroxyl- or methoxy-substituted C₁-C₆ alkylene divalent radical, a dihydroxyl- or dimethoxy-substituted C₂-C₆ alkylene divalent radical, a divalent radical of —C₂H₄—(O—C₂H₄)$_{m2}$—, a divalent radical of —Z₄—S—S—Z₄—, a hydroxyl- or methoxy-substituted C₁-C₆ alkylene divalent radical, or a substituted or unsubstituted phenylene divalent radical, Z₃ is a divalent radical of any one of (a) —NR$_{n3}$—, (b)

(c) —NR₀—Z₅—NR₀—, and (d) —O—Z₆—O—, Z₄ is a C₁-C₆ alkylene divalent radical, Z₅ is a C₁-C₆ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, Z₆ is (a) a C₁-C₆ alkylene divalent radical, (b) a divalent radical of

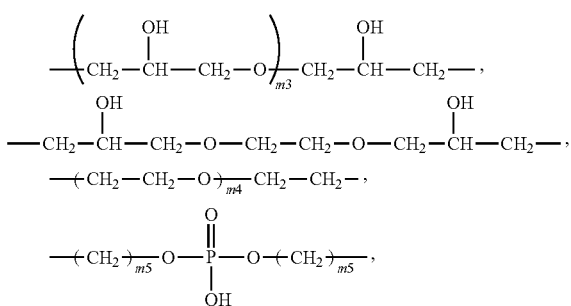

or (c) a substituted $C_3$-$C_8$ alkylene divalent radical having a hydroxyl group or phosphonyloxy group, $Z_7$ is a divalent radical of

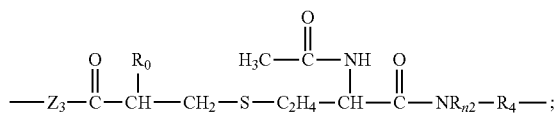

and $Z_8$ is a divalent radical of

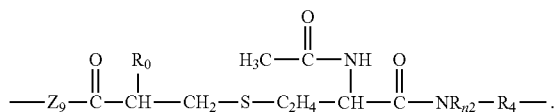

Polysiloxane vinylic crosslinkers of formula (1) can be obtained from commercial suppliers, prepared according to procedures described in US, or prepared by reacting glycidyl (meth)acrylate (meth)acryloyl chloride with a di-amino-terminated polydimethylsiloxane or a di-hydroxyl-terminated polydimethylsiloxane, reacting isocyantoethyl (meth)acrylate with di-hydroxyl-terminated polydimethylsiloxanes, reacting an amino-containing acrylic monomer with di-carboxyl-terminated polydimethylsiloxane in the presence of a coupling agent (a carbodiimide); reacting a carboxyl-containing acrylic monomer with di-amino-terminated polydimethylsiloxane in the presence of a coupling agent (a carbodiimide). Or reacting a hydroxyl-containing acrylic monomer with a di-hydroxy-terminated polydisiloxane.

Preferred examples of polysiloxane vinylic crosslinkers of formula (1) include without limitation α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylami no-carbonyloxy-(polyethylenoxy)propyl]-terminated polydimethylsiloxane, combinations thereof.

Chain-extended polysiloxane vinylic crosslinkers of formula (2) can be prepared according to the procedures described in U.S. Pat. Nos. 5,034,461, 5,416,132, 5,449,729, 5,760,100, 7,423,074, and 8,529,057. Chain-extended polysiloxane vinylic crosslinkers of formula (3), (4) or (5) can be prepared according to the procedures described in detail in U.S. Pat. App. Ser. No. 62/406,465 filed 11 Oct. 2016. Chain-extended polysiloxane vinylic crosslinkers of formula (6) can be prepared according to the procedures described in detail in U.S. Pat. App. Ser. No. 62/406,467 filed 11 Oct. 2016. Chain-extended polysiloxane vinylic crosslinkers of formula (6) can be prepared according to the procedures described in U.S. Pat. No. 8,993,651.

Another class of preferred chain-extended polysiloxane vinylic crosslinkers are those which each comprise at least two polysiloxane segments and dangling hydrophilic polymer chains each covalently attached to a divalent radical separating each pair of adjacent polysiloxane segments and having at least two pendant hydrophilic groups and/or chains as disclosed in US20120088843A1; those which each comprise at least two polysiloxane segments and dangling hydrophilic polymer chains each covalently attached to a divalent radical separating each pair of adjacent polysiloxane segments as disclosed in US20120088844A1.

Any polycarbosiloxane vinylic crosslinkers can be used in the invention. Examples of preferred polycarbosiloxane vinylic crosslinkers include without limitation those disclosed in U.S. Pat. Nos. 7,915,323 and 8,420,711 and in U.S. Pat. Appl. Pub. Nos. 2012/0244088 and 2012/0245249.

Any hydrophilic vinylic monomers can be used in the invention. Examples of preferred hydrophilic vinylic monomers are alkyl (meth)acrylamides (as described below), hydroxyl-containing acrylic monomers (as described below), carboxyl-containing acrylic monomers (as described below), amino-containing acrylic monomers (as described below), N-vinyl amide monomers (as described below), methylene-containing pyrrolidone monomers (i.e., pyrrolidone derivatives each having a methylene group connected to the pyrrolidone ring at 3- or 5-position) (as described below), acrylic monomers having a $C_1$-$C_4$ alkoxyethoxy group (as described below), vinyl ether monomers (as described below), allyl ether monomers (as described below), phosphorylcholine-containing vinylic monomers (as described below), allyl alcohol, N-2-hydroxyethyl vinyl carbamate, N-carboxyvinyl-β-alanine (VINAL), N-carboxyvinyl-α-alanine, and combinations thereof.

Examples of alkyl (meth)acrylamides includes without limitation (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof.

Examples of hydroxyl-containing acrylic monomers include without limitation N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof.

Examples of amino-containing acrylic monomers include without limitation N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof.

Examples of carboxyl-containing acrylic monomers include without limitation 2-(meth)acrylamidoglycolic acid, (meth)acrylic acid, ethylacrylic acid, and combinations thereof.

Examples of preferred N-vinyl amide monomers include without limitation N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, or combinations thereof.

Examples of preferred methylene-containing (=CH$_2$) pyrrolidone monomers include without limitations 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

Examples of preferred acrylic monomers having a $C_1$-$C_4$ alkoxyethoxy group include without limitation ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, and combinations thereof.

Examples of preferred vinyl ether monomers include without limitation ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof.

Examples of preferred allyl ether monomers include without limitation ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof.

Examples of preferred phosphorylcholine-containing vinylic monomers include without limitation (meth)acryloyloxyethyl phosphorylcholine (aka, MPC, or 2-((meth)acryloyloxy)ethyl-2'-(trimethylammonio)ethylphosphate), (meth)acryloyloxypropyl phosphorylcholine (aka, 3-((meth)acryloyloxy) propyl-2'-(trimethylammonio)ethylphosphate), 4-((meth)acryloyloxy)butyl-2'-(trimethylammonio) ethylphosphate, 2-[(meth)acryloylamino]ethyl-2'-(trimethylammonio)-ethylphosphate, 3-[(meth)acryloylamino]propyl-2'-(trimethylammonio) ethylphosphate, 4-[(meth)acryloylamino]butyl-2'-(trimethylammonio)ethylphosphate, 5-((meth)acryloyloxy) pentyl-2'-(trimethylammonio)ethyl phosphate, 6-((meth) acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(trimethylammonio) ethylphosphate, 2-((meth)acryloyoxy)ethyl-2'-(trimethylammonio)ethyl phosphate, 2-((meth)acryloyloxy)propyl-2'-(trimethylammonio)-ethylphosphate, 2-((meth)acryloyloxy) butyl-2'-(trimethylammonio)ethylphosphate, 2-((meth) acryloyloxy) pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof.

In accordance with the invention, any non-silicone vinylic crosslinkers can be used in this invention. Examples of preferred non-silicone vinylic cross-linking agents include without limitation ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, and combinations thereof. A preferred non-silicone vinylic cross-linking agent is tetra(ethyleneglycol) di-(meth)acrylate, tri(ethyleneglycol) di-(meth)acrylate, ethyleneglycol di-(meth)acrylate, di(ethyleneglycol) di-(meth)acrylate, tetraethyleneglycol divinyl ether, triethyleneglycol divinyl ether, diethyleneglycol divinyl ether, ethyleneglycol divinyl ether, triallyl isocyanurate, triallyl cyanurate, and combinations thereof.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy) butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl)peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis (isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis(2-cyclopropylpropionitrile), 2,2'-azobis(methyl isobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety.

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germane-based Norrish Type I photoinitiators. Examples of benzoylphosphine initiators include 2,4,6-trimethylbenzoyl-diphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators, which can be incorporated, for example, into a macromer or can be used as a special monomer, are also suitable. Examples of reactive photoinitiators are those disclosed in EP 632 329.

Where a vinylic monomer capable of absorbing ultraviolet radiation and high energy violet light (HEVL) is used in the invention, a Germane-based Norrish Type I photoinitiator and a light source including a light in the region of about 400 to about 550 nm are preferably used to initiate a free-radical polymerization. Any Germane-based Norrish Type I photoinitiators can be used in this invention, so long as they are capable of initiating a free-radical polymerization under irradiation with a light source including a light in the region of about 400 to about 550 nm. Examples of Germane-based Norrish Type I photoinitiators are acylgermanium compounds described in U.S. Pat. No. 7,605,190.

In accordance with a preferred embodiment of the invention, a fluid polymerizable composition of the invention preferably can further comprise at least one blending vinylic monomer. Examples of preferred blending vinylic monomers include $C_1$-$C_{10}$ alkyl (meth)acrylate (e.g., methyl (meth)acrylate, ethyl (meth)acrylate, propyl (meth)acrylate, isopropyl (meth)acrylate, 2-ethylhexyl (meth)acrylate, pentyl (meth)acrylate, hexyl (meth)acrylate, etc.), cyclopentylacrylate, cyclohexylmethacrylate, cyclohexylacrylate, isobornyl (meth)acrylate, styrene, 4,6-trimethylstyrene, t-butyl styrene, trifluoroethyl (meth)acrylate, hexafluoroisopropyl (meth)acrylate, hexafluorobutyl (meth)acrylate, or combinations thereof. Methyl methacrylate is the most preferred blending vinylic monomer.

In accordance with a preferred embodiment of the invention, a fluid polymerizable composition of the invention can further comprise at least one UV-absorbing vinylic monomer and optionally (but preferably) at least one UV/HEVL-absorbing vinylic monomer. The term "UV/HEVL-absorbing vinylic monomer" refers to a vinylic monomer that can absorb UV light and high-energy-violet-light (i.e., light having wavelength between 380 nm and 440 nm.

Any suitable UV-absorbing vinylic monomers and UV/HEVL-absorbing vinylic monomers can be used in a fluid polymerizable composition for preparing a polymer of the invention. Examples of preferred UV-absorbing and UV/HEVL-absorbing vinylic monomers include without limitation: 2-(2-hydroxy-5-vinylphenyl)-2H-benzotriazole, 2-(2-hydroxy-5-acryloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9CI) (CAS #83063-87-0).

In a preferred embodiment, a fluid polymerizable composition of the invention comprises a UV-absorbing vinylic monomer and a UV/HEVL absorbing vinylic monomer. More preferably, the UV-absorbing vinylic monomer is 2-[2'-hydroxy-5'-(2-methacryloxyethyl)phenyl)]-2H-benzotriazole (Norbloc), and the UV/HEVL absorbing vinylic monomer is 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), or combinations thereof. The resultant SiHy contact lens is characterized by having the UVB transmittance of about 10% or less (preferably about 5% or less, more preferably about 2.5% or less, even more preferably about 1% or less) between 280 and 315 nanometers and a UVA transmittance of about 30% or less (preferably about 20% or less, more preferably about 10% or less, even more preferably about 5% or less) between 315 and 380 nanometers and a Violet transmittance of about 70% or less, preferably about 60% or less, more preferably about 50% or less, even more preferably about 40% or less) between 380 nm and 440 nm.

In accordance with the invention, a fluid polymerizable composition of the invention comprises: (a) from about 20% to about 79% (preferably from about 20% to about 75%, more preferably from about 25% to about 70%, even more preferably from about 30% to about 65%) by weight of the silicone-containing vinylic monomer and/or the silicone-containing vinylic crosslinker; (b) 20% to about 79% (preferably from about 20% to about 75%, more preferably from about 25% to about 70%, even more preferably from about 30% to about 65%) by weight of the hydrophilic vinylic monomer; (c) from 0 to about 2.5% (preferably from 0 to about 2.0%, more preferably from about 0.01% to about 1.5%, even more preferably from about 0.05% to about 1.0%) by weight of the non-silicone vinylic crosslinker; (d) from about 0.05% to about 2.0% (preferably from about 0.1% to about 2.0%, more preferably from about 0.2% to about 1.5%, even more preferably from about 0.3% to about 1.2%) by weight of the free-radical initiator; (e) from 0 to about 25% (preferably from 0 to about 20%, more preferably from about 2.5% to about 17.5%, even more preferably from about 5% to about 15%) by weight of the blending vinylic monomer; and (f) from 0 to about 3.0%, preferably about 0.1% to about 2.5%, more preferably about 0.2% to about 2.0%, by weight of the UV-absorbing vinylic monomer and/or the UV/HEVL-absorbing vinylic monomer, relative to the total amount of all polymerizable materials in the fluid polymerizable composition, provided that the sum of the amounts of polymerizable materials (a) to (f) and other not-listed polymerizable materials is 100%. Preferably, the sum of the amounts of polymerizable materials (a) and (b) is at least 70% (preferably at least 75%, more preferably at least 80, even more preferably at least 85%) by weight relative to the total amount of all polymerizable materials in the fluid polymerizable composition.

A fluid polymerizable composition of the invention can also comprise other necessary components known to a person skilled in the art, such as, for example, a visibility tinting agent (e.g., one or more polymerizable dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art.

A fluid polymerizable composition (SiHy lens formulation) of the invention is a solution prepared by dissolving all of the desirable components in the organic solvent.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In accordance with the invention, a mold used in the invention is preferably made of a hydrophobic polymeric material (i.e., having a water contact angle by static sessile drop method of about 100 degrees or larger), more preferably made of a polypropylene.

In accordance with the invention, the fluid polymerizable composition can be introduced (dispensed) into a cavity formed by a mold according to any known methods.

After the fluid polymerizable composition is dispensed into the mold, it is polymerized to produce a SiHy contact lens precursor. Crosslinking may be initiated thermally or actinically (but preferably is initiated thermally) to crosslink the polymerizable materials in the fluid polymerizable composition.

The thermal polymerization is carried out conveniently in an above-mentioned solvent at elevated temperature, for example at a temperature of from 25 to 100° C. and preferably 40 to 100° C. The reaction time may vary within wide limits, but is conveniently, for example, from 1 to 24 hours or preferably from 2 to 12 hours. It is advantageous to previously degas the components and solvents used in the polymerization reaction and to carry out copolymerization reaction under an inert atmosphere, for example under a nitrogen or argon atmosphere.

The actinic polymerization can then be triggered off by actinic radiation, for example light, in particular UV light or visible light of a suitable wavelength. The spectral requirements can be controlled accordingly, if appropriate, by addition of suitable photosensitizers.

Opening of the mold so that the molded article (i.e., the SiHy contact lens precursor) can be removed from the mold may take place in a manner known per se.

In accordance with the invention, the extraction liquid medium is any solvent capable of dissolving the organic solvent, unpolymerized polymerizable materials, and oligomers in the dry contact lens. Water, any organic solvents known to a person skilled in the art, or a mixture thereof can be used in the invention. Preferably, the organic solvents used extraction liquid medium are water, a buffered saline, a $C_1$-$C_3$ alkyl alcohol, 1,2-propylene glycol, a polyethyleneglycol having a number average molecular weight of about 400 Daltons or less, a $C_1$-$C_6$ alkylalcohol, or combinations thereof.

The extracted contact lens can then be hydrated according to any method known to a person skilled in the art.

The hydrated soft contact lens can further subject to further processes, such as, for example, surface treatment, packaging in lens packages with a packaging solution which is well known to a person skilled in the art; sterilization such as autoclave at from 118 to 124° C. for at least about 30 minutes; and the like.

A hydrated soft contact lens of the invention has: an oxygen permeability of at least about 40 barrers (preferably at least about 60 barrers, more preferably at least about 80 barrers); an elastic modulus of from about 0.2 MPa to about 2.0 MPa (preferably from about 0.3 MPa to about 1.5 MPa or less, more preferably from about 0.4 MPa to about 1.2 or less); an equilibrium water content of from about 15% to about 75% (preferably from about 20% to about 70%, more preferably from about 30% to about 65%) by weight when fully hydrated.

Although various embodiments of the invention have been described using specific terms, devices, and methods, such description is for illustrative purposes only. The words used are words of description rather than of limitation. As would be obvious to one skilled in the art, many variations and modifications of the invention may be made by those skilled in the art without departing from the spirit and scope of the novel concepts of the disclosure. In addition, it should be understood that aspects of the various embodiments of the invention may be interchanged either in whole or in part or can be combined in any manner and/or used together, as illustrated below:

1. A method for making contact lenses, comprising the steps of:
    (1) obtaining a fluid polymerizable composition, wherein the composition comprises an organic solvent and dissolved therein polymerizable materials, wherein the polymerizable materials comprises (a) from about 20% to about 79% by weight of at least one silicone-containing vinylic monomer and/or at least one silicone-containing vinylic crosslinker; (b) from 20% to about 79% by weight of at least one hydrophilic vinylic monomer; (c) from 0 to about 2.5% by weight of at least one non-silicone vinylic crosslinker; (d) from about 0.05% to about 2.0% by weight of at least one free-radical initiator; (e) from 0 to about 25% by weight of a blending vinylic monomer; and (f) from 0 to about 3.0% by weight of at least one UV-absorbing vinylic monomer and/or at least one UV/HEVL-absorbing vinylic monomer, relative to the total amount of all polymerizable materials in the fluid polymerizable composition, provided that the sum of the amounts of polymerizable materials (a) to (f) and other not-listed polymerizable materials is 100%, wherein the organic solvent has a boiling point of at least 95° C. or higher and is present in the polymerizable composition in an amount of from about 4% to about 15% by weight relative to the total amount of the fluid polymerizable composition and is capable of functioning as a processing-aid tool for controlling lens diameter of a hydrated soft contact lens made from the polymerizable composition;
    (2) introducing the fluid polymerizable composition into a cavity formed by a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces;
(3) curing thermally or actinically the fluid polymerizable composition in the mold to form a dry contact lens;
(4) extracting the dry contact lens with a liquid extraction medium to remove the organic solvent, unpolymerized polymerizable components and oligomers from the dry lens to obtain an extracted contact lens; and
(5) hydrating the extracted contact lens with water or an aqueous solution to obtain the hydrated soft contact lens,
wherein the amount of the organic solvent in the polymerizable composition is adjusted to achieve a targeted lens diameter of the hydrated soft contact lens without affecting adversely the equilibrium water content of the hydrated soft contact lens.

2. The method of embodiment 1, wherein the step of curing is carried out thermally.

3. The method of embodiment 1 or 2, wherein the organic solvent has a boiling point of at least 100° C. or higher.

4. The method of embodiment 1 or 2, wherein the organic solvent has a boiling point of at least 105° C. or higher (preferably at least 105° C. or higher).

5. The method of embodiment 1 or 2, wherein the organic solvent has a boiling point of at least 110° C. or higher.

6. The method of any one of embodiments 1 to 5, wherein the organic solvent is present in the polymerizable composition in an amount of from about 5.0% to about 12.5% by weight relative to the total amount of the fluid polymerizable composition.

7. The method of any one of embodiments 1 to 5, wherein the organic solvent is present in the polymerizable composition in an amount of from about 5.5% to about 11% by weight relative to the total amount of the fluid polymerizable composition.

8. The method of any one of embodiments 1 to 5, wherein the organic solvent is present in the polymerizable composition in an amount of from about 5.5% to about 9.5% by weight relative to the total amount of the fluid polymerizable composition.

9. The method of any one of embodiments 1 to 8, wherein the organic solvent is a $C_3$-$C_8$ alkyl alcohol.

10. The method of any one of embodiments 1 to 8, wherein the organic solvent is a $C_4$-$C_8$ alkyl alcohol.

11. The method of any one of embodiments 1 to 8, wherein the organic solvent is a $C_4$-$C_6$ alkyl alcohol.

12. The method of any one of embodiments 1 to 11, wherein the polymerizable materials comprises from about 20% to about 75% by weight of said at least one silicone-containing vinylic monomer and/or said at least one silicone-containing vinylic crosslinker.

13. The method of any one of embodiments 1 to 11, wherein the polymerizable materials comprises from about 25% to about 70% by weight of said at least one silicone-containing vinylic monomer and/or said at least one silicone-containing vinylic crosslinker.

14. The method of any one of embodiments 1 to 11, wherein the polymerizable materials comprises from about 30% to about 65% by weight of said at least one silicone-containing vinylic monomer and/or said at least one silicone-containing vinylic crosslinker.

15. The method of any one of embodiments 1 to 14, wherein the polymerizable materials comprises from about 20% to about 75% by weight of said at least one hydrophilic vinylic monomer.

16. The method of any one of embodiments 1 to 14, wherein the polymerizable materials comprises from about 25% to about 70% by weight of said at least one hydrophilic vinylic monomer.

17. The method of any one of embodiments 1 to 14, wherein the polymerizable materials comprises from about 30% to about 65% by weight of said at least one hydrophilic vinylic monomer.

18. The method of any one of embodiments 1 to 17, wherein the polymerizable materials comprises from 0 to about 2.0% by weight of said at least one non-silicone vinylic crosslinker.

19. The method of any one of embodiments 1 to 17, wherein the polymerizable materials comprises from about 0.01% to about 1.5% by weight of said at least one non-silicone vinylic crosslinker.

20. The method of any one of embodiments 1 to 17, wherein the polymerizable materials comprises from about 0.05% to about 1.0% by weight of said at least one non-silicone vinylic crosslinker.

21. The method of any one of embodiments 1 to 20, wherein the polymerizable materials comprises from about 0.1% to about 2.0% by weight of said at least one free-radical initiator.

22. The method of any one of embodiments 1 to 20, wherein the polymerizable materials comprises from about 0.2% to about 1.5% by weight of said at least one free-radical initiator.

23. The method of any one of embodiments 1 to 20, wherein the polymerizable materials comprises from about 0.3% to about 1.2% by weight of said at least one free-radical initiator.

24. The method of any one of embodiments 1 to 23, wherein the polymerizable materials comprises from 0 to about 20% by weight of the blending vinylic monomer.

25. The method of any one of embodiments 1 to 23, wherein the polymerizable materials comprises from about 2.5% to about 17.5% by weight of the blending vinylic monomer.

26. The method of any one of embodiments 1 to 23, wherein the polymerizable materials comprises from about 5% to about 15% by weight of the blending vinylic monomer.

27. The method of any one of embodiments 1 to 26, wherein the polymerizable materials comprises from about 0.1% to about 2.5% by weight of said at least one UV-absorbing vinylic monomer and/or said at least one UV/HEVL-absorbing vinylic monomer.

28. The method of any one of embodiments 1 to 26, wherein the polymerizable materials comprises from about 0.2% to about 2.0% by weight of said at least one UV-absorbing vinylic monomer and/or said at least one UV/HEVL-absorbing vinylic monomer.

29. The method of any one of embodiments 1 to 28, wherein the polymerizable materials comprise at least one silicone containing vinylic monomer which is a vinylic monomer having a bis(trialkylsilyloxy)alkylsilyl group or a tris(trialkylsilyloxy)silyl group, a polysiloxane vinylic monomer, a polycarbosiloxane vinylic monomer, 3-methacryloxy propylpentamethyldisiloxane, t-butyldimethylsiloxyethyl vinyl carbonate, trimethylsilylethyl vinyl carbonate, and trimethylsilylmethyl vinyl carbonate, and combinations thereof.

30. The method of any one of embodiments 1 to 28, wherein the polymerizable materials comprise at least one silicone containing vinylic monomer which is a vinylic monomer of formula (M1) or (M2)

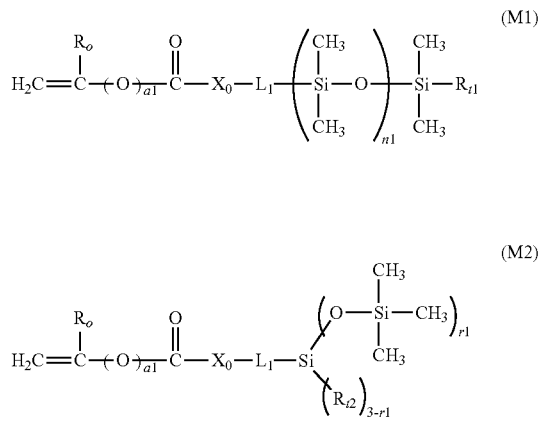

in which: a1 is zero or 1; $R_o$ is H or methyl; $X_o$ is O or $NR_1$; $L_1$ is a $C_2$-$C_8$ alkylene divalent radical or a divalent radical of $-L_1'-X_1-L_1''-$, $-(C_2H_4O)_{q1}-L_1''-$, $-(C_2H_4O)_{q1}-CONH-L_1''-$, $-L_1'-NHCOO-(C_2H_4O)_{q1}-L_1''-$, $-CH_2-CH(OH)-CH_2-X_1'-(C_2H_4O)_{q2}-L_1''-$, $-L_1'-X_1'-CH_2-CH(OH)-CH_2-O-L_1''-$, or $-(C_2H_4O)_{q1}CH_2-CH(OH)CH_2-O-L_1''$; $L_1'$ is a $C_2$-$C_8$ alkylene divalent radical which has zero or one hydroxyl group; $L_1''$ is $C_3$-$C_8$ alkylene divalent radical which has zero or one hydroxyl group; $X_1$ is O, $NR_1$, NHCOO, OCONH, $CONR_1$, or $NR_1CO$; $R_1$ is H or a $C_1$-$C_4$ alkyl having 0 to 2 hydroxyl group; $R_{t1}$ and $R_{t2}$ independent of each other are a $C_1$-$C_4$ alkyl; $X_1'$ is O or $NR_1$; q1 is an integer of 1 to 20; q2 is an integer of 0 to 20; n1 is an integer of 3 to 25; and r1 is an integer of 2 or 3.

31. The method of any one of embodiments 1 to 28, wherein the polymerizable materials comprise at least one silicone containing vinylic monomer which is tris(trimethylsilyloxy)silylpropyl (meth)acrylate, [3-(meth)acryloxy-2-hydroxypropyloxy]propylbis(trimethylsiloxy) methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy)methylsilane, 3-(meth)acryloxy-2-hydroxypropyloxy)propyltris(trimethylsiloxy)silane, N-[tris(trimethylsiloxy)silylpropyl]-(meth)acrylamide, N-(2-hydroxy-3-(3-(bis(trimethylsilyloxy)methylsilyl)propyloxy)propyl)-2-methyl (meth)acrylamide, N-(2-hydroxy-3-(3-(bis(trimethylsilyloxy)methylsilyl)propyloxy)propyl) (meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl)propyloxy)propyl) (meth)acrylamide, N-[tris(dimethylpropylsiloxy)silylpropyl]-(meth)acrylamide, N-[tris(dimethylphenylsiloxy) silylpropyl] (meth)acrylamide, N-[tris(dimethylethylsiloxy)silylpropyl] (meth)acrylamide, N,N-bis[2-hydroxy-3-(3-(bis(trimethylsilyloxy)methylsilyl) propyloxy)propyl]-2-methyl (meth)acrylamide, N,N-bis[2-hydroxy-3-(3-(bis(trimethylsilyloxy)methylsilyl)propyloxy)-propyl] (meth)acrylamide, N,N-bis[2-hydroxy-3-(3-(tris(trimethylsilyloxy)silyl)propyloxy)-propyl]-2-methyl (meth)acrylamide, N,N-bis [2-hydroxy-3-(3-(tris(trimethylsilyloxy)-silyl)propyloxy) propyl] (meth)acrylamide, N-[2-hydroxy-3-(3-(t-butyldimethylsilyl)-propyloxy) propyl]-2-methyl (meth) acrylamide, N-[2-hydroxy-3-(3-(t-butyldimethylsilyl) propyloxy)propyl] (meth)acrylamide, N,N-bis[2-hydroxy-3-(3-(t-butyldimethylsilyl)propyloxy)propyl]-2-methyl (meth)acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, or a combination thereof.

32. The method of any one of embodiments 1 to 28, wherein the polymerizable materials comprise at least one silicone containing vinylic monomer which is α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxy-propyloxy-2-hydroxypropyloxypropyl]-terminated ω-$C_1$-$C_4$-alkyl terminated polydimethylsiloxane, α-[3-(meth)acryloxyisopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω-$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[3-(meth)acryloxybutylamino-2-hydroxypropyloxypropyl]-terminated ω-$C_1$-$C_4$-alkyl terminated polydimethylsiloxane, α-(meth)acryloxy(polyethylenoxy)-2-hydroxypropyloxypropyl]-terminated ω-$C_1$-$C_4$-alkyl terminated polydimethylsiloxane, α-[(meth)acryloxy-2-hydroxypropyloxyethoxypropyl]-terminated ω-$C_1$-$C_4$-alkyl terminated polydimethylsiloxane, α-[(meth)acryloxy-2-hydroxypropyl-N-ethylaminopropyl]-terminated ω-$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy)propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxy-propyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl] terminated ω-$C_1$-$C_4$-alkyl polydimethylsiloxane, α-[3-[N-methyl-(meth)acryloylamido]-2-hydroxypropyloxypropyl]terminated ω-$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy)dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, or a mixture thereof.

33. The method of any one of embodiments 1 to 32, wherein the polymerizable materials comprise at least one silicone-containing vinylic crosslinker which is a polysiloxane vinylic crosslinker, a polycarbosiloxane vinylic crosslinker, or a combination thereof.

34. The method of any one of embodiments 1 to 32, wherein the polymerizable materials comprise at least one silicone-containing vinylic crosslinker which is a di-(meth)acryloyl-terminated polydimethylsiloxane, a di-vinyl carbonate-terminated polydimethylsiloxane; a di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane, or a combination thereof.

35. The method of any one of embodiments 1 to 32, wherein the polymerizable materials comprise at least one silicone-containing vinylic crosslinker which is a vinylic crosslinker of formula (I)

$R_{I3}$ is a monovalent radical of any one of formula (Ia) to (Ie)

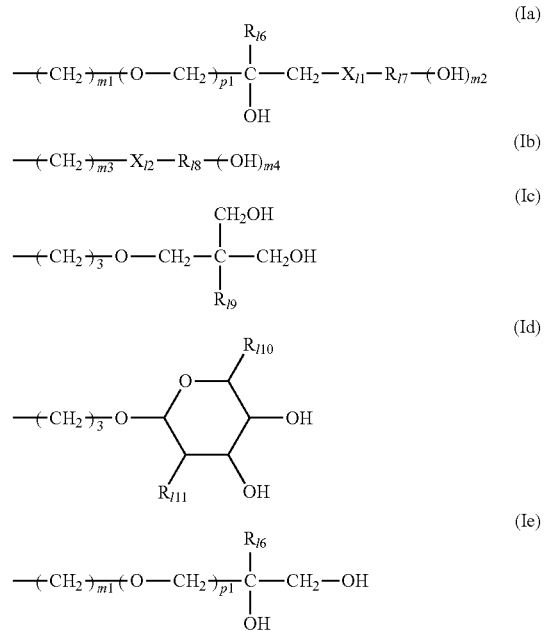

p1 is zero or 1; m1 is an integer of 2 to 4; m2 is an integer of 1 to 5; m3 is an integer of 3 to 6; m4 is an integer of 2 to 5;

$R_{I6}$ is hydrogen or methyl;

$R_{I7}$ is a $C_2$-$C_6$ hydrocarbon radical having (m2+1) valencies;

$R_{I8}$ is a $C_2$-$C_6$ hydrocarbon radical having (m4+1) valencies;

$R_{I9}$ is ethyl or hydroxymethyl;

$R_{I0}$ is methyl or hydromethyl;

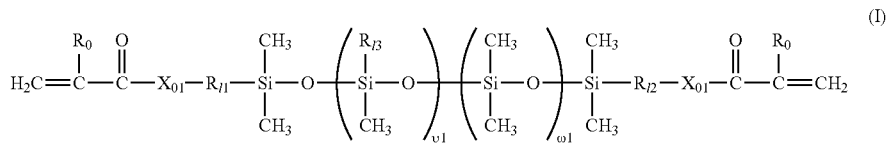

in which:

υ1 is an integer of from 30 to 500 and ω1 is an integer of from 1 to 75, provided that ω1/υ1 is from about 0.035 to about 0.15;

$X_{01}$ is O or $NR_N$ in which $R_N$ is hydrogen or $C_1$-$C_{10}$-alkyl;

$R_o$ is hydrogen or methyl;

$R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{I4}$ and $R_{I5}$ independently of each other are a substituted or unsubstituted $C_1$-$C_{10}$ alkylene divalent radical;

$R_{I1}$ is hydroxyl or methoxy;

$X_{I1}$ is a sulfur linkage of —S— or a teriary amino linkage of —$NR_{I12}$— in which $R_{I12}$ is $C_1$-$C_1$ alkyl, hydroxyethyl, hydroxypropyl, or 2,3-dihydroxypropyl; and $X_{I2}$ is an amide linkage of

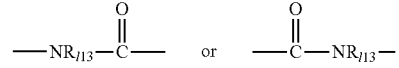

in which $R_{I13}$ is hydrogen or $C_1$-$C_{10}$ alkyl.

36. The method of any one of embodiments 1 to 32, wherein the polymerizable materials comprise at least one silicone-containing vinylic crosslinker which is a vinylic crosslinker of any one of formula (1) to (7)

$$H_2C=\underset{R_0}{\overset{|}{C}}-(O)_{a1}-\overset{O}{\overset{\|}{C}}-X_0-L_1-\underset{CH_3}{\overset{CH_3}{\overset{|}{Si}}}-O-\left(\underset{CH_3}{\overset{CH_3}{\overset{|}{Si}}}-O\right)_{v1}-\underset{CH_3}{\overset{CH_3}{\overset{|}{Si}}}-L_1-X_0-\overset{O}{\overset{\|}{C}}-(O)_{a1}-\underset{R_0}{\overset{|}{C}}=CH_2 \quad (1)$$

$$E_1'-\left[\underset{CH_3}{\overset{CH_3}{\overset{|}{Si}}}-O-\left(\underset{CH_3}{\overset{CH_3}{\overset{|}{Si}}}-O\right)_{v2}-L_3\right]_{\omega2}-\left(\underset{CH_3}{\overset{CH_3}{\overset{|}{Si}}}-O\right)_{v2}-\underset{CH_3}{\overset{CH_3}{\overset{|}{Si}}}-E_1' \quad (2)$$

$$H_2C=\underset{R_0}{\overset{|}{C}}-\overset{O}{\overset{\|}{C}}-X_{02}-R_4-\left[\left(\underset{CH_3}{\overset{CH_3}{\overset{|}{Si}}}-O\right)_{v2}-\underset{CH_3}{\overset{CH_3}{\overset{|}{Si}}}-hpL_1\right]_{\omega2}-\left(\underset{CH_3}{\overset{CH_3}{\overset{|}{Si}}}-O\right)_{v2}-\underset{CH_3}{\overset{CH_3}{\overset{|}{Si}}}-R_5-X_{02}-\overset{O}{\overset{\|}{C}}-\underset{R_0}{\overset{|}{C}}=CH_2 \quad (3)$$

$$E_2-\left[\left(\underset{CH_3}{\overset{CH_3}{\overset{|}{Si}}}-O\right)_{v2}-\underset{CH_3}{\overset{CH_3}{\overset{|}{Si}}}-hpL_2\right]_{\omega2}-\left(\underset{CH_3}{\overset{CH_3}{\overset{|}{Si}}}-O\right)_{v2}-\underset{CH_3}{\overset{CH_3}{\overset{|}{Si}}}-E_2 \quad (4)$$

$$E_2-\left[\left(\underset{CH_3}{\overset{CH_3}{\overset{|}{Si}}}-O\right)_{v2}-\underset{CH_3}{\overset{CH_3}{\overset{|}{Si}}}-hpL_3\right]_{\omega2}-\left(\underset{CH_3}{\overset{CH_3}{\overset{|}{Si}}}-O\right)_{v2}-\underset{CH_3}{\overset{CH_3}{\overset{|}{Si}}}-E_2 \quad (5)$$

$$E_3-R_6-\left[\left(\underset{CH_3}{\overset{CH_3}{\overset{|}{Si}}}-O\right)_{v2}-\underset{CH_3}{\overset{CH_3}{\overset{|}{Si}}}-R_2-hpL_4-pOAlk-hpL_4-R_6-\left(\underset{CH_3}{\overset{CH_3}{\overset{|}{Si}}}-O\right)_{v2}-\underset{CH_3}{\overset{CH_3}{\overset{|}{Si}}}-R_7\right]-E_3 \quad (6)$$

$$E_4-\left[\left(\underset{CH_3}{\overset{CH_3}{\overset{|}{Si}}}-O\right)_{v3}-\underset{CH_3}{\overset{CH_3}{\overset{|}{Si}}}-G_1-CH_2-\underset{R_0}{\overset{|}{CH}}-S-J_0-S-\underset{R_0}{\overset{|}{CH}}-CH_2-G_1\right]_{\omega3}-\left(\underset{CH_3}{\overset{CH_3}{\overset{|}{Si}}}-O\right)_{v3}-\underset{CH_3}{\overset{CH_3}{\overset{|}{Si}}}-E_4 \quad (6)$$

in which:

$v1$ is an integer of from 30 to 500;

$v2$ is an integer of from 5 to 50;

$v3$ is an integer of from 5 to 100;

$\omega2$ and $\omega3$ independent of each other are an integer of from 1 to 15;

a1 and g1 independent of each other is zero or 1;

h1 is an integer of 1 to 20 and h2 is an integer of 0 to 20;

m1 and m3 independent of each other is 0 or 1, m2 is an integer of 1 to 6, m4 is an integer of 1 to 5, m5 is 2 or 3;

q1 is an integer of 1 to 20, q2 is an integer of 0 to 20, q3 is an integer of 0 to 2, q4 is an integer of 2 to 50, q5 and q6 independent of each other are a number of 0 to 35, provided that (q4+q5+q6) is an integer of 2 to 50;

x+y is an integer of from 10 to 30;

e1 is an integer of 5 to 100, p1 and b1 independent of each other are an integer of 0 to 50, provided that (e1+p1+b1)≥10 and e1/(p1+b1)≥2 when (p1+b1)≥1;

$R_o$ is H or methyl;

$R_1$, $R_{1n}$, $R_{2n}$, $R_{3n}$, and $R_{4n}$ independent of one another are H or a $C_1$-$C_4$ alkyl having 0 to 2 hydroxyl group;

$R_{n5}$ is H or a $C_1$-$C_4$ alkyl;

$R_2$ is a $C_4$-$C_{14}$ hydrocarbon divalent radical;

$R_3$ is a $C_2$-$C_6$ alkylene divalent radical;

$R_4$ and $R_5$ independent of each other are a $C_1$-$C_6$ alkylene divalent radical or a $C_1$-$C_6$ alkylene-oxy-$C_1$-$C_6$ alkylene divalent radical;

$R_6$ and $R_7$ independent of each other are a $C_1$-$C_6$ alkylene divalent radical or a $C_1$-$C_6$ alkoxy-$C_1$-$C_6$ alkylene divalent radical;

$R_8$ and $R_9$ independent of each other are a substituted or unsubstituted $C_1$-$C_{12}$ alkylene divalent radical;

$X_o$, $X_1'$, $X_{o1}$, $X_{02}$, and $X_{03}$ independent of one another are O or $NR_1$;

$X_1$ is O, $NR_1$, NHCOO, OCONH, $CONR_1$, or $NR_1CO$;

$X_{o4}$ is —COO— or —$CONR_{n5}$—;

$X_{o5}$ and $X_{o7}$ independent of each other are a direct bond, —COO— or —$CONR_{n5}$—;

$X_{o6}$ is a direct bond, a $C_1$-$C_6$ alkylene divalent radical, a $C_1$-$C_6$ alkylenoxy divalent radical, —COO—, or —$CONR_{n5}$—;

$X_{o8}$ is a direct bond or —COO—;

$X_{o9}$ is O or $NR_{n5}$;

$X_{10}$ is a direct bond, a $C_1$-$C_6$ alkylene divalent radical, —COO—, or —$CONR_{n5}$—;

$E_1'$ is a monovalent radical of

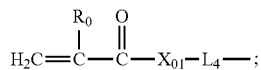

$E_2$ is a monovalent radical of

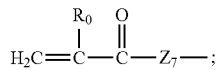

$E_3$ is a monovalent radical of

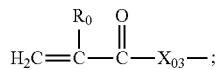

$E_4$ is a monovalent radical of

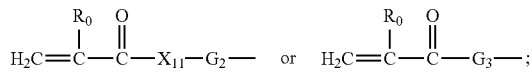

$L_1$ is a $C_2$-$C_8$ alkylene divalent radical or a divalent radical of -$L_1'$-$X_1$-$L_1''$-, $-(C_2H_4O)_{q1}$-$L_1''$-, $-C_2H_4O)_{q1}$—CONH-$L_1''$-, -$L_1'$-NHCOO—$(C_2H_4O)$-$L_1''$-, —$CH_2$—CH(OH)—$CH_2$—$X_1'$—$(C_2H_4O)_{q2}$-$L_1''$-, -$L_1'$-$X_1'$—$CH_2$—CH(OH)—$CH_2$—O-$L_1''$-, or $-(C_2H_4O)_{q1}$—$CH_2$—CH(OH)—$CH_2$—O-$L_1''$-;

$L_1'$ is a $C_2$-$C_8$ alkylene divalent radical which has zero or one hydroxyl group;

$L_1''$ is $C_3$-$C_8$ alkylene divalent radical which has zero or one hydroxyl group;

$L_3$ is a divalent radical of -$L_3'$-O$-(C_2H_4O)_{q2}$—CONH—$R_2$$-(NHCO-PE-CONH—R_2)_{g1}$—NHCO$-(C_2H_4)_{q2}$—O-$L_3'$— in which PE is a divalent radical of $-(CH_2CH_2O)_{q3}$—$Z_0$—$CF_2$$-(OCF_2)_x$$-(OCF_2CF_2)_y$$OCF_2$—$Z_0$$-(OCH_2CH_2)_{q3}$— or

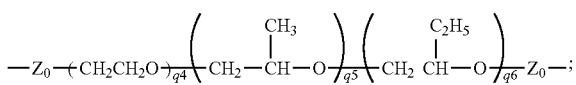

$L_3'$ is $C_3$-$C_8$ alkylene divalent radical;

$L_4$ is a divalent radical of —$C_2H_4$—NHCO—O—$(C_2H_4O)_{q2}$-$L_3'$-, $-(C_2H_4O)_{q1}$—CONH—$R_2$—NHCO—O$-(C_2H_4O)_{q2}$-$L_3'$-, —$R_3$—O—CONH—$R_2$—NHCO—O$-(C_2H_4O)_{q2}$-$L_3'$-, —$CH_2$—CH(OH)—$CH_2$—O$-(C_2H_4O)_{q2}$-$L_3'$-, or $-(C_2H_4O)_{q2}$-$L_3'$-;

$hpL_1$ is a divalent radical of

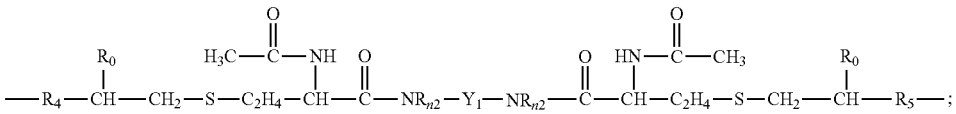

$hpL_2$ is a divalent radical of

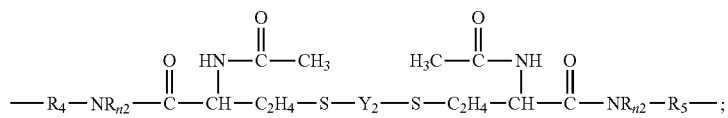

$hpL_3$ is a divalent radical of

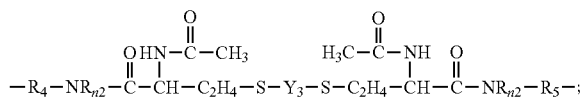

$hpL_4$ is a divalent radical of

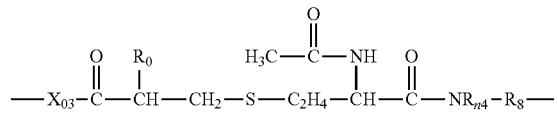

or

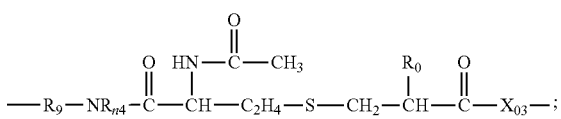

pOAlk is a divalent radical of $-(EO)_{e1}(PO)_{p1}(BO)_{b1}-$ in which EO is an oxyethylene unit ($-CH_2CH_2O-$), PO is an oxypropylene unit

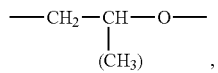

and BO is an oxybutylene unit

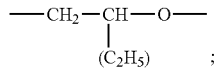

$M_0$ is $C_3$-$C_8$ alkylene divalent radical;

$M_1$ is a $C_4$-$C_{14}$ hydrocarbon divalent radical;

$M_2$ and $M_3$ independent of each other are a $C_1$-$C_6$ alkylene divalent radical;

$J_0$ is a $C_1$-$C_{12}$ hydrocarbon radical having 0 to 2 hydroxyl or carboxyl groups;

$G_1$ is a direct bond, a $C_1$-$C_4$ alkylene divalent radical, or a bivalent radical of $-X_{04}-(C_2H_4O)_{h1}-CONH-M_1-NHCO-O-(C_2H_4O)_{h2}-M_0-$, $-X_{05}-M_2-O-CONH-M_1-NHCO-O-(C_2H_4O)_{h2}-M_0-$, $-X_{06}-CH_2-CH(OH)-CH_2-O-(C_2H_4O)_{h2}-M_0-$, $-X_{07}-(C_2H_4O)_{h2}-M_0-$; $-X_{08}-M_3-NHCOO-(C_2H_4O)_{h1}-M_0-$, $-X_{10}-CH_2-CH(OH)-CH_2-X_{09}-(C_2H_4O)_{h2}-M_0-$, $-X_{07}-M_3-X_{09}-CH_2-CH(OH)-CH_2-O-M_0-$, or $-X_{08}-(C_2H_4O)_{h1}-CH_2-CH(OH)-CH_2-O-M_0-$ in which $M_0$ is linked to Si atom while $X_{04}$ to $X_{10}$ are linked to the group of $-CH_2-$ in formula (7) and at least one of $J_0$ and G1 in formula (7) comprises at least one moieties selected from the group consisting of hydroxyl groups, urethane linkage of $-OCONH-$, amino groups of $-NHR°$, amino linkages of $-NH-$, amide linkages of $-CONH-$, carboxyl groups, and combinations thereof;

$G_2$ is a $C_1$-$C_4$ alkylene divalent radical or a bivalent radical of $-(C_2H_4O)_{h1}-CONH-M_1-NHCO-(OC_2H_4)_{h2}-M_0-$, $-M_2-O-CONH-M_1-NHCO-O-(C_2H_4O)_{h2}-M_0-$, $-CH_2-CH(OH)-CH_2-O-(C_2H_4O)_{h2}-M_0-$, $-(C_2H_4O)_{h2}M_0-$; $-M_3-NHCOO-(C_2H_4O)_{h1}-M_0-$, $-CH_2-CH(OH)-CH_2-X_{09}-(C_2H_4O)_{h2}-M_0-$, $-M_3-X_{09}-CH_2-CH(OH)-CH_2-O-M_0-$, or $-(C_2H_4O)_{h1}-CH_2-CH(OH)-CH_2-O-M_0-$;

$G_3$ is a divalent radical of

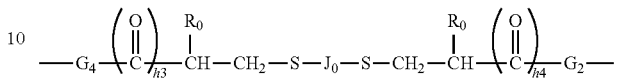

h3 and h4 independent of each other are 1 or 0;

G4 is a divalent radical of any one of (a) $-NR_3'-$ in which $R_3'$ is hydrogen or $C_1$-$C_3$ alkyl,

(c) $-NR_0-G_5-NR_0-$ in which $G_5$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, and (d) $-O-G_6-O-$ in which $G_6$ is a $C_1$-$C_6$ alkylene divalent radical, a divalent radical of

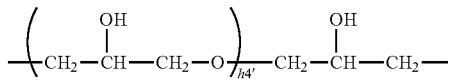

in which h4' is 1 or 2, a divalent radical of

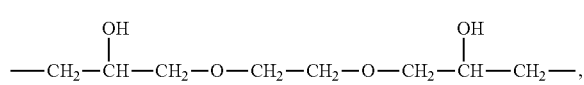

a divalent radical of $-(CH_2-CH_2-O)_{h5}-CH_2-CH_2-$ in which h5 is an integer of 1 to 5, a divalent radical of

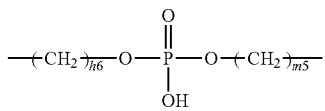

in which h6 is 2 or 3, or a substituted $C_3$-$C_8$ alkylene divalent radical having a hydroxyl group or phosphonyloxy group;

$Y_1$ is a $C_1$-$C_6$ alkylene divalent radical, 2-hydroxylpropylene divalent radical, 2-(phosphonyloxy)propylene divalent radical, 1,2-dihydroxyethylene divalent radical, a divalent radical of

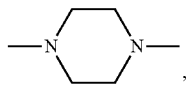

, or a divalent radical of

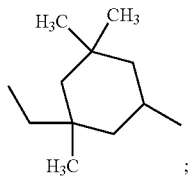

$Y_2$ is a divalent radical of

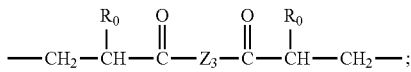

$Y_3$ is a divalent radical of

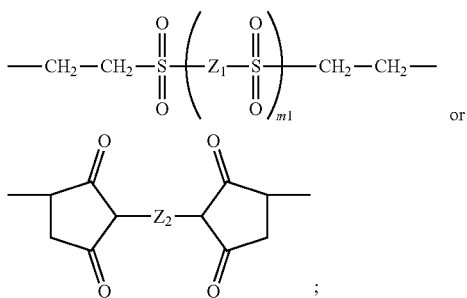

$Z_0$ is a direct bond or a $C_1$-$C_{12}$ alkylene divalent radical;
$Z_1$ is a $C_1$-$C_6$ alkylene divalent radical, a hydroxyl- or methoxy-substituted $C_1$-$C_6$ alkylene divalent radical, or a substituted or unsubstituted phenylene divalent radical,
$Z_2$ is a $C_1$-$C_6$ alkylene divalent radical, a hydroxyl- or methoxy-substituted $C_1$-$C_6$ alkylene divalent radical, a dihydroxyl- or dimethoxy-substituted $C_2$-$C_6$ alkylene divalent radical, a divalent radical of —$C_2H_4$—(O—$C_2H_4$)$_{m2}$—, a divalent radical of —$Z_4$—S—S—$Z_4$—, a hydroxyl- or methoxy-substituted $C_1$-$C_6$ alkylene divalent radical, or a substituted or unsubstituted phenylene divalent radical,
$Z_3$ is a divalent radical of any one of (a) —$NR_{n3}$—, (b)

(c) —$NR_0$—$Z_5$—$NR_0$—, and (d) —O—$Z_6$—O—,
$Z_4$ is a $C_1$-$C_6$ alkylene divalent radical,
$Z_5$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical,
$Z_6$ is (a) a $C_1$-$C_6$ alkylene divalent radical, (b) a divalent radical of

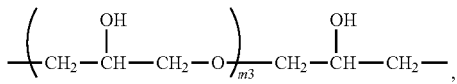

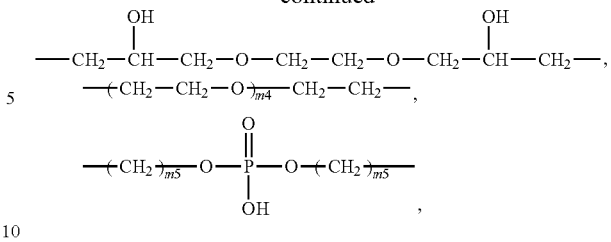

or (c) a substituted $C_3$-$C_8$ alkylene divalent radical having a hydroxyl group or phosphonyloxy group,
$Z_7$ is a divalent radical of

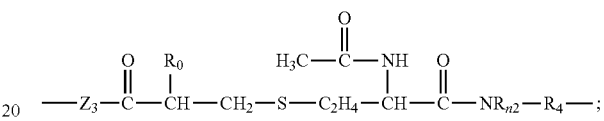

and
$Z_8$ is a divalent radical of

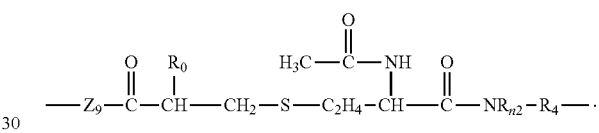

37. The method of any one of embodiments 1 to 32, wherein the polymerizable materials comprise at least one silicone-containing vinylic crosslinker which is α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethyl-amino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, or a combination thereof.

38. The method of any one of embodiments 1 to 37, wherein said at least one hydrophilic vinylic monomer comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) acrylic monomers having a $C_1$-$C_4$ alkoxyethoxy group selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (10) a phosphorylcholine-containing vinylic monomer selected from the group consisting of (meth)acryloyloxyethyl phosphorylcholine, (meth)acryloyloxypropyl phosphorylcholine, 4-((meth)acryloyloxy) butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloyloylamino]butyl-2'-(tri methylammonio) ethylphosphate, 5-((meth)acryloyloxy)pentyl-2'-(trimethylammonio)ethyl phosphate, 6-((meth)acryloyloxy) hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio) ethylphosphate, 2-(vinyloxycarbonyl)ethyl-2'-(trimethylammonio)ethyl phosphate, 2-(allyloxycarbonyl)ethyl-2'-

(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (11) allyl alcohol; (12) N-2-hydroxyethyl vinyl carbamate; (13) N-carboxyvinyl-β-alanine (VINAL); (14) N-carboxyvinyl-α-alanine; (15) or combinations thereof.

39. The method of embodiment 38, wherein said at least one hydrophilic vinylic monomer comprises N-vinylpyrrolidone, N-vinyl-N-methyl acetamide, or combinations thereof.

40. The method of embodiment 38 or 39, wherein said at least one hydrophilic vinylic monomer comprises N,N-dimethyl (meth)acrylamide.

41. The method of any one of embodiments 38 to 40, wherein said at least one hydrophilic vinylic monomer comprises N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, or combinations thereof.

42. The method of any one of embodiments 1 to 41, wherein said at least one non-silicone vinylic cross-linking agents comprises ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, or combinations thereof.

43. The method of any one of embodiments 1 to 42, wherein said at least one blending vinylic monomer comprises methyl methacrylate.

44. The method of any one of embodiments 1 to 43, wherein the polymerizable materials comprise 2-[2'-hydroxy-5'-(2-methacryloxyethyl)phenyl)]-2H-benzotriazole and a UV/HEVL absorbing vinylic monomer selected from the group consisting of 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole, 2-{2'-Hydroxy-3'-tert-butyl-5'-[3'-methacryloyloxypropoxy]phenyl}-5-chloro-2H-benzotriazole, 2-[2'-Hydroxy-3'-tert-butyl-5'-(3'-acryloyloxypropoxy)phenyl]-5-trifluoromethyl-2H-benzotriazole, and combinations thereof.

45. The method of any one of embodiments 1 to 44, wherein the liquid extraction medium is water or an aqueous solution.

46. The method of any one of embodiments 1 to 44, wherein the liquid extraction medium is a mixture of water with one or more organic solvents selected from the group consisting of 1,2-propylene glycol, a polyethyleneglycol having a number average molecular weight of about 400 Daltons or less, a $C_1$-$C_3$ alkyl alcohol, and combination thereof.

47. The method of any one of embodiments 1 to 44, wherein the liquid extraction medium is one or more organic solvents selected from the group consisting of 1,2-propylene glycol, a polyethyleneglycol having a number average molecular weight of about 400 Daltons or less, a $C_1$-$C_3$ alkylalcohol, and combination thereof.

48. A hydrated silicone hydrogel contact lens obtained according to the method of any one of claims 1 to 47.

49. The silicone hydrogel contact lens of embodiment 87, wherein the silicone hydrogel contact lens has an oxygen permeability of at least 50 barrers, an elastic modulus of from about 0.2 MPa to about 1.5 MPa, and an equilibrium water content of from about 15% to about 75% by weight.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the apparent oxygen permeability ($Dk_{app}$), the apparent oxygen transmissibility (Dk/t), the intrinsic (or edge-corrected) oxygen permeability ($Dk_i$ or $Dk_c$) of a lens and a lens material are determined according to procedures described in Example 1 of U.S. Pat. Appl. Pub. No. 2012/0026457 A1.

Equilibrium Water Content

The equilibrium water content (EWC) of contact lenses is determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5) and three sample pans are used. Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan and then being divided by the number of lenses for each sample pan. The measurements of three sample pans from one single batch of contact lenses are averaged to obtain the averaged equilibrium water content for that batch of contact lenses.

Determination of Diameter of Hydrated Contact Lens

FIG. 1 shows schematically the general lens dimensions which are typically determined by a contact lens manufacturer. The general dimensions include center thickness (CT) (110), anterior sagittal height (ASag) (120), posterior sagittal height (PSag) (140), base curve equivalent (BCE) (150), edge thickness (ET) (160), and diameter (180). Measurements of the general lens dimensions can be carried out on fully hydrated contact lenses in a wetcell by using a low coherence interferometer similar to that described by Heidemana and Greivenkampin in their paper (Optical Engineering 55(3), 034106 (March 2016)).

For measurements, a contact lens is seated on the flate bottom surface of the wetcell which is filled with a phosphate buffered saline and a low coherence interferometer is placed at the geometric center of the lens using a motion controller. The interferometer measures thicknesses of material based off of reflections between different material surfaces. The center of the lens is determined by the measurement by the camera.

The Diameter is defined as the outermost edge of the lens viewed from above the lens. The edge points are fit to an ellipse and the diameter is calculated as the average of the major and minor ellipse diameters. Typically, contact lenses have highly circular diameters and either a circular or elliptical fitting will result in similar values. However, if a lens is slightly out of round, an ellipse more accurately describes the shape of the contact lens diameter than a circle. The lens diameters of 3 to 10 contact lenses from one single batch of contact lenses are measured and averaged to obtain the averaged lens diameter for that batch of contact lenses.

Elastic Modulus

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Chemicals

The following abbreviations are used in the following examples: NVP represents N-vinylpyrrolidone; DMA represents N,N-dimethylacrylamide; MMA represents methyl methacrylate; TEGDMA represent triethyleneglycol dimethacrylate; VAZO 64 represents 2,2'-di methyl-2,2'azodipropiononitrile; Nobloc is 2-[3-(2H-Benzotriazol-2-yl)-4-hydroxyphenyl]ethyl methacrylate from Aldrich; TAA represents tert-amyl alcohol; PrOH represents 1-propanol; IPA represents isopropanol; DC 1173 represents Darocur 1173® photoinitiator; PBS represents a phosphate-buffered saline which has a pH of 7.2±0.2 at 25° C. and contains about 0.044 wt. % $NaH_2PO_4$—$H_2O$, about 0.388 wt. % $Na_2HPO_4.2H_2O$, and about 0.79 wt. % NaCl and; wt. % represents weight percent; D9 represents monobutyl-terminated monomethacryloxypropyl-terminated polydimethylsiloxane (Mw~984 g/mol from Shin-Etsu); CEPDMS represents a di-methacrylate-terminated chain-extended polydimethylsiloxane (Mn~9000 g/mol), which has three polydimethylsiloxane (PDMS) segments linked via diurethane linkages between two PDMS segments and two urethane linkages each located between one terminal methacrylate group and one PDMS segment, is prepared according to method similar to what described in Example 2 of U.S. Pat. No. 8,529,057; "G4" macromer represents a di-methacryloyloxypropyl-terminated polysiloxane (Mn~13.5K g/mol, OH content~1.8 meq/g) of formula (A).

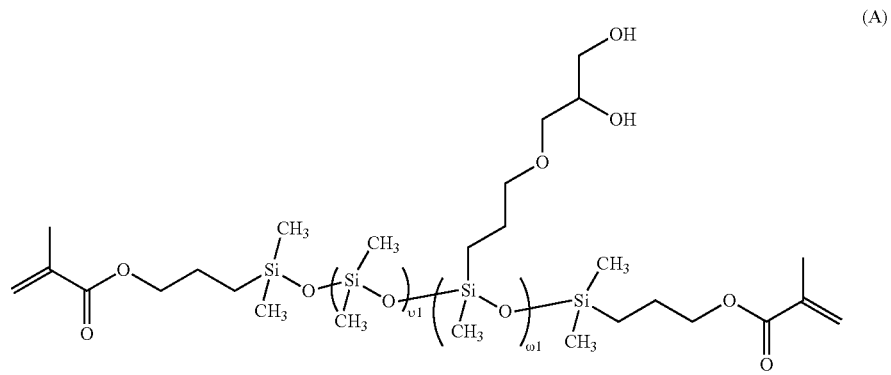

(A)

Example 2

A lens formulation is purged with nitrogen at room temperature for 30 to 35 minutes. The $N_2$-purged lens formulation is introduced into polypropylene molds and thermally cured in an oven under the following curing conditions: ramping from room temperature to a first temperature and then holding at the first temperature for a first curing time period; ramping from the first temperature to a second temperature and holding at the second temperature for a second curing time period; optionally ramping from the second temperature to a third temperature and holding at the third temperature for a third curing time period; and optionally ramping from the third temperature to a fourth temperature and holding at the fourth temperature for a fourth curing time period.

Lens molds are opened by using a demolding machine with a push pin. Lenses are pushed onto base curve molds with a push pin and then molds are separated into base curve mold halves and front curve mold halves. The base curve mold halves with a lens thereon are placed in an ultrasonic device (e.g., Dukane's single horn ultrasonic device). With a certain energy force, a dry state lens is released from mold. The dry state lens is loaded in a designed extraction tray. Alternatively, lenses can be removed from the base curve mold halves by floating off (i.e., soaking in an organic solvent, e.g., IPA, without ultrasonic). The lenses removed from the molds are subjected to an extraction process using water or an organic solvent or a mixture of solvents for at least 30 minutes. For example, extracted in 50% IPA for 30 min, or in 100% IPA for 15 min then back to 50% IPA for 30 min, DI water for 30 min and finally in PBS saline overnight. Inspected lens is packaged in lens packages containing a phosphate buffered saline (pH~7.2) and autoclaved at 121° C. for about 30-45 minutes.

Example 3

A lens formulation is purged with nitrogen at room temperature for 30 to 35 minutes. The $N_2$-purged lens formulation is introduced into polypropylene molds and cured by UV/visible light (Hamamatsu lamp) for a curing time period. The post cast molding procedures described in Example 2 are used in this process for producing SiHy contact lenses.

Examples 4-8

Lens formulations (fluid polymerizable compositions) are prepared to have compositions (in weight part units). All the prepared formulations consists two parts: 102.06 weight part units of the polymerizable materials (0.65 weight part units of TEGDMA, 10 weight part units of G4, 33 weight part units of D9, 46 weight part units of NVP, 10 weight part units of MMA, 1.5 weight part units of Norbloc, 0.40 weight part units of UV28, 0.01 weight part units of RB247, 0.5 weight part units of V64) and various weight part units of an alcohol as shown in Tables 1 to 5. The formulations are prepared by adding listed components in their targeted amounts into a clean bottle, with a stir bar to mix at 600 rpm for 30 minutes at room temperature. After all the solid is dissolved, a filtration of the formulation is carried out by using 2.7 µm glass-microfiber-filter.

TABLE 1

| | Composition (Weigh Part Units) | | | | |
|---|---|---|---|---|---|
| | 4-1 | 4-2 | 4-3 | 4-4 | 4-5 |
| Polymerizable materials | 102.06 | 102.06 | 102.06 | 102.06 | 102.06 |
| Ethanol | 6 | 8 | 10 | 12 | 14 |

TABLE 2

| | Composition (Weigh Part Units) | | | | |
|---|---|---|---|---|---|
| | 5-1 | 5-2 | 5-3 | 5-4 | 5-5 |
| Polymerizable materials | 102.06 | 102.06 | 102.06 | 102.06 | 102.06 |
| 1-Propanol | 6 | 8 | 10 | 12 | 14 |

TABLE 3

| | Composition (Weigh Part Units) | | | | |
|---|---|---|---|---|---|
| | 6-1 | 6-2 | 6-3 | 6-4 | 6-5 |
| Polymerizable materials | 102.06 | 102.06 | 102.06 | 102.06 | 102.06 |
| 1-Butanol | 6 | 8 | 10 | 12 | 14 |

TABLE 4

| | Composition (Weigh Part Units) | | | | |
|---|---|---|---|---|---|
| | 7-1 | 7-2 | 7-3 | 7-4 | 7-5 |
| Polymerizable materials | 102.06 | 102.06 | 102.06 | 102.06 | 102.06 |
| TAA | 6 | 8 | 10 | 12 | 14 |

TABLE 4

| | Composition (Weigh Part Units) | | | | |
|---|---|---|---|---|---|
| | 8-1 | 8-2 | 8-3 | 8-4 | 8-5 |
| Polymerizable materials | 102.06 | 102.06 | 102.06 | 102.06 | 102.06 |
| 1-Octanol | 6 | 8 | 10 | 12 | 14 |

SiHy contact lenses are prepared from those fluid polymerizable compositions according to curing processes described in Example 2, with the following curing profile: 55° C./80° C./100° C. for 40 minutes at each temperature.

Example 9

In examples 4-8, five organic solvents: ethanol, 1-propanol, tert-amyl alcohol, 1-butanol and 1-octanol, are used in the lens formulations to produce hydrated contact lenses. They have a boiling point of 78.5° C., 97° C., 102° C., 117.7° C., and 194.4° C. respectively. The amounts of each of the five organic solvents are varied from 5.6 wt % to 12.1 wt % in order to examine the effects of the concentration of each organic solvent upon the diameter and equilibrium water content of hydrated contact lenses. The diameters and equilibrium water contents of hydrated contact lenses prepared in Examples 4 to 8 are determined according to the procedures described in Example 1. The changes of lens diameter and equilibrium water content (EWC) as function of the concentration (weight percentage) of the solvent present in the lens formulation, and the averaged results are reported in Table 5.

TABLE 5

| [Alcohol] | Ethanol | | 1-Propanol | | Tert-Amyl Alcohol | |
|---|---|---|---|---|---|---|
| Wt % | D (mm) | EWC (wt %) | D (mm) | EWC (wt %) | D (mm) | EWC (wt %) |
| 5.6 | 14.01 ± 0.14 | 53.79 ± 0.21 | 14.25 ± 0.13 | 53.84 ± 0.07 | 14.32 ± 0.02 | 53.56 ± 0.28 |
| 7.3 | 13.88 ± 0.04 | 53.46 ± 0.49 | 14.15 ± 0.04 | 54.05 ± 0.18 | 14.23 ± 0.02 | 53.91 ± 0.26 |
| 8.9 | 13.71 ± 0.04 | 52.96 ± 0.22 | 13.97 ± 0.02 | 53.61 ± 0.05 | 14.15 ± 0.02 | 54.47 ± 0.16 |
| 10.5 | 13.51 ± 0.02 | 52.35 ± 0.26 | 13.81 ± 0.02 | 53.34 ± 0.29 | 14.04 ± 0.01 | 54.29 ± 0.07 |

TABLE 5-continued

| 12.1 | 13.37 ± 0.01 | 52.13 ± 0.30 | 13.66 ± 0.01 | 53.31 ± 0.04 | 13.95 ± 0.01 | 54.57 ± 0.16 |

| [Alcohol] | 1-Butanol | | 1-Octanol | |
|---|---|---|---|---|
| Wt % | D (mm) | EWC (wt %) | D (mm) | EWC (wt %) |
| 5.6 | 14.19 ± 0.01 | 53.85 ± 0.24 | 14.22 ± 0.03 | 53.54 ± 0.29 |
| 7.3 | 14.05 ± 0.02 | 53.86 ± 0.18 | 14.09 ± 0.04 | 54.00 ± 0.22 |
| 8.9 | 13.91 ± 0.02 | 53.91 ± 0.09 | 13.98 ± 0.02 | 54.31 ± 0.35 |
| 10.5 | 13.74 ± 0.01 | 53.43 ± 0.22 | 13.84 ± 0.02 | 54.05 ± 0.18 |
| 12.1 | 13.59 ± 0.02 | 52.94 ± 0.31 | 13.76 ± 0.11 | 54.01 ± 0.15 |

All the publications and patents which have been cited herein above are hereby incorporated by reference in their entireties.

What is claimed is:

1. A method for making contact lenses, comprising the steps of:
   (1) obtaining a fluid polymerizable composition, wherein the composition comprises an organic solvent and dissolved therein polymerizable materials,
   wherein the polymerizable materials comprise (a) from about 20% to about 79% by weight of at least one silicone-containing vinylic monomer and/or at least one silicone-containing vinylic crosslinker; (b) from 20% to about 79% by weight of at least one hydrophilic vinylic monomer; (c) from about 0.01% to about 1.5% by weight of at least one non-silicone vinylic crosslinker; (d) from about 0.05% to about 2.0% by weight of at least one free-radical initiator; (e) from about 5% to about 15% by weight of a blending vinylic monomer; and (f) from 0 to about 3.0% by weight of at least one UV-absorbing vinylic monomer and/or at least one UV/HEVL-absorbing vinylic monomer, relative to the total amount of all polymerizable materials in the fluid polymerizable composition, provided that the sum of the amounts of polymerizable materials (a) to (f) and other not-listed polymerizable materials is 100%,
   wherein the organic solvent is a $C_3$-$C_8$ alkyl alcohol, has a boiling point of at least 95° C. or higher, and is present in the polymerizable composition in an amount of from about 5.0% to about 12.5% by weight relative to the total amount of the fluid polymerizable composition and is capable of functioning as a processing-aid tool for controlling lens diameter of a hydrated soft contact lens made from the polymerizable composition;
   (2) introducing the fluid polymerizable composition into a cavity formed by a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces;
   (3) curing thermally or actinically the fluid polymerizable composition in the mold to form a dry contact lens;
   (4) extracting the dry contact lens with a liquid extraction medium to remove the organic solvent, unpolymerized polymerizable components and oligomers from the dry lens to obtain an extracted contact lens; and
   (5) hydrating the extracted contact lens with water or an aqueous solution to obtain the hydrated soft contact lens,
   wherein the amount of the organic solvent in the polymerizable composition is adjusted to achieve a targeted lens diameter of the hydrated soft contact lens without affecting adversely the equilibrium water content of the hydrated soft contact lens.

2. The method of claim 1, wherein the step of curing is carried out thermally.

3. The method of claim 2, wherein the organic solvent has a boiling point of at least 100° C. or higher.

4. The method of claim 3, wherein the organic solvent is a $C_3$-$C_6$ alkyl alcohol.

5. The method of claim 4, wherein the polymerizable materials comprise at least one silicone containing vinylic monomer which is a vinylic monomer having a bis(trialkylsilyloxy)alkylsilyl group or a tris(trialkylsilyloxy)silyl group, a polysiloxane vinylic monomer, a polycarbosiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, or combinations thereof.

6. The method of claim 4, wherein the polymerizable materials comprise a vinylic monomer of formula (M1) and/or a vinylic monomer of formula (M2)

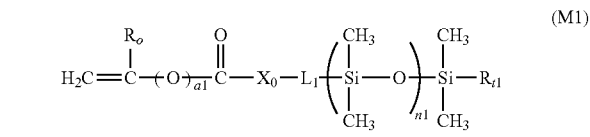

(M1)

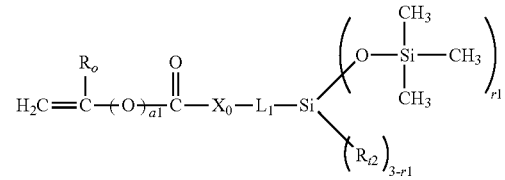

(M2)

in which: a1 is zero or 1; $R_o$ is H or methyl; $X_o$ is O or $NR_1$; $L_1$ is a $C_2$-$C_8$ alkylene divalent radical or a divalent radical of -$L_1$'-$X_1$-$L_1$"-, -$(C_2H_4O)_{q1}L_1$"-, -$(C_2H_4O)_{q1}$CONH-$L_1$"-, -$L_1$'-NHCOO-$(C_2H_4O)_{q1}L_1$"-, —$CH_2$—CH(OH)—$CH_2$—$X_1$-$(C_2H_4O)_{q2}L_1$"-, -$L_1$'-$X_1$'—$CH_2$—CH(OH)—$CH_2$—O-$L_1$"-, or -$(C_2H_4O)_{q1}CH_2$—CH(OH)—$CH_2$—O-$L_1$"-; $L_1$' is a $C_2$-$C_8$ alkylene divalent radical which has zero or one hydroxyl group; $L_1$" is $C_3$-$C_8$ alkylene divalent radical which has zero or one hydroxyl group; $X_1$ is O, $NR_1$, NHCOO, OCONH, $CONR_1$, or $NR_1CO$; $R_1$ is H or a $C_1$-$C_4$ alkyl having 0 to 2 hydroxyl group; $R_{t1}$ and $R_{t2}$ independent of each other are a $C_1$-$C_4$ alkyl; $X_1$' is O or $NR_1$; q1 is an integer of 1 to 20; q2 is an integer of 0 to 20; n1 is an integer of 3 to 25; and r1 is an integer of 2 or 3.

7. The method of claim 4, wherein the polymerizable materials comprise at least one silicone-containing vinylic crosslinker which is a vinylic crosslinker of formula (I)

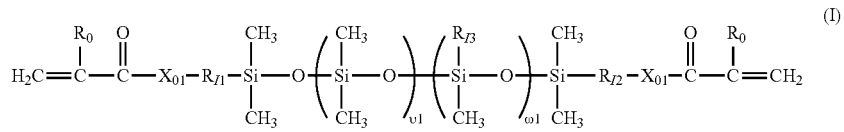

in which:
  υ1 is an integer of from 30 to 500 and ω1 is an integer of from 1 to 75, provided that ω1/υ1 is from about 0.035 to about 0.15;
  $X_{01}$ is O or $NR_N$ in which $R_N$ is hydrogen or $C_1$-$C_{10}$-alkyl;
  $R_o$ is hydrogen or methyl;
  $R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{I4}$ and $R_{I5}$ independently of each other are a substituted or unsubstituted $C_1$-$C_{10}$ alkylene divalent radical;
  $R_{I3}$ is a monovalent radical of any one of formula (Ia) to (Ie)

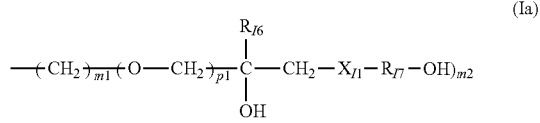

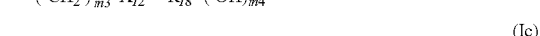

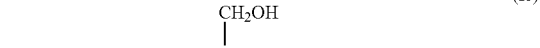

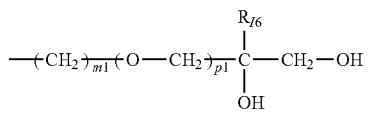

p1 is zero or 1; m1 is an integer of 2 to 4; m2 is an integer of 1 to 5; m3 is an integer of 3 to 6;
m4 is an integer of 2 to 5;
$R_{I6}$ is hydrogen or methyl;
$R_{I7}$ is a $C_2$-$C_6$ hydrocarbon radical having (m2+1) valencies;
$R_{I8}$ is a $C_2$-$C_6$ hydrocarbon radical having (m4+1) valencies;
$R_{I9}$ is ethyl or hydroxymethyl;
$R_{I10}$ is methyl or hydromethyl;
$R_{I11}$ is hydroxyl or methoxy;
$X_{I1}$ is a sulfur linkage of —S— or a teriary amino linkage of —$NR_{I12}$— in which $R_{I12}$ is $C_1$-$C_1$ alkyl, hydroxyethyl, hydroxypropyl, or 2,3-dihydroxypropyl; and
$X_{I2}$ is an amide linkage of

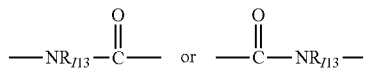

in which $R_{I13}$ is hydrogen or $C_1$-$C_{10}$ alkyl.

8. The method of claim 4, wherein the polymerizable materials comprise at least one silicone-containing vinylic crosslinker which is a vinylic crosslinker of any one of formula (1) to (7)

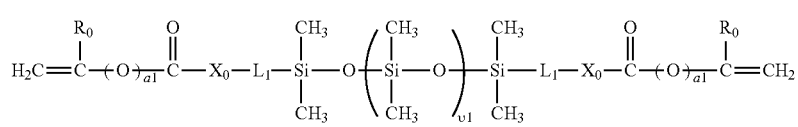

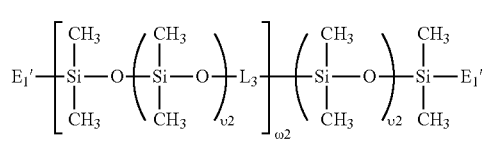

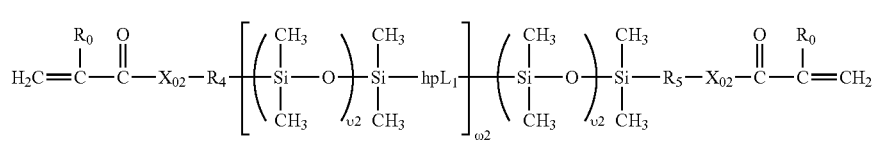

-continued

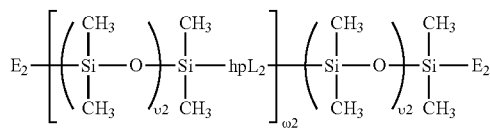   (4)

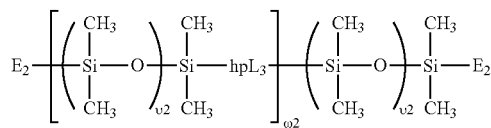   (5)

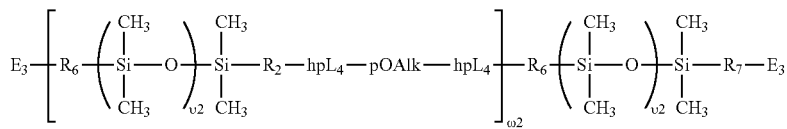   (6)

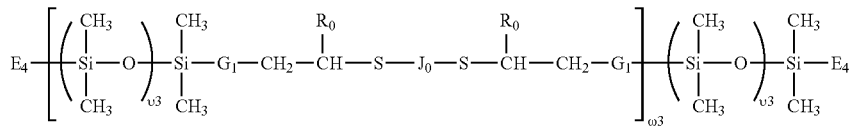   (6)

in which:
υ1 is an integer of from 30 to 500;
υ2 is an integer of from 5 to 50;
υ3 is an integer of from 5 to 100;
ω2 and ω3 independent of each other are an integer of from 1 to 15;
a1 and g1 independent of each other is zero or 1;
h1 is an integer of 1 to 20 and h2 is an integer of 0 to 20;
m1 and m3 independent of each other is 0 or 1, m2 is an integer of 1 to 6, m4 is an integer of 1 to 5, m5 is 2 or 3;
q1 is an integer of 1 to 20, q2 is an integer of 0 to 20, q3 is an integer of 0 to 2, q4 is an integer of 2 to 50, q5 and q6 independent of each other are a number of 0 to 35, provided that (q4+q5+q6) is an integer of 2 to 50;
x+y is an integer of from 10 to 30;
e1 is an integer of 5 to 100, p1 and b1 independent of each other are an integer of 0 to 50, provided that (e1+p1+b1)≥10 and e1/(p1+b1)≥2 when (p1+b1)≥1;
$R_o$ is H or methyl;
$R_1$, $R_{1n}$, $R_{2n}$, $R_{3n}$, and $R_{4n}$ independent of one another are H or a $C_1$-$C_4$ alkyl having 0 to 2 hydroxyl group;
$R_{n5}$ is H or a $C_1$-$C_{10}$ alkyl;
$R_2$ is a $C_4$-$C_{14}$ hydrocarbon divalent radical;
$R_3$ is a $C_2$-$C_6$ alkylene divalent radical;
$R_4$ and $R_5$ independent of each other are a $C_1$-$C_6$ alkylene divalent radical or a $C_1$-$C_6$ alkylene-oxy-$C_1$-$C_6$ alkylene divalent radical;
$R_6$ and $R_7$ independent of each other are a $C_1$-$C_6$ alkylene divalent radical or a $C_1$-$C_6$ alkoxy-$C_1$-$C_6$ alkylene divalent radical;
$R_8$ and $R_9$ independent of each other are a substituted or unsubstituted $C_1$-$C_{12}$ alkylene divalent radical;
$X_o$, $X_1'$, $X_{o1}$, $X_{o2}$, and $X_{o3}$ independent of one another are O or $NR_1$;
$X_1$ is O, $NR_1$, NHCOO, OCONH, $CONR_1$, or $NR_1CO$;
$X_{o4}$ is —COO— or —$CONR_{n5}$—;
$X_{o5}$ and $X_{o7}$ independent of each other are a direct bond, —COO— or —$CONR_{n5}$—;
$X_{o6}$ is a direct bond, a $C_1$-$C_6$ alkylene divalent radical, a $C_1$-$C_6$ alkylenoxy divalent radical, —COO—, or —$CONR_{n5}$—;
$X_{o8}$ is a direct bond or —COO—;
$X_{o9}$ is O or $NR_{n5}$;
$X_{10}$ is a direct bond, a $C_1$-$C_6$ alkylene divalent radical, —COO—, or —$CONR_{n5}$—;

$E_1'$ is a monovalent radical of

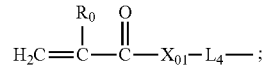

$E_2$ is a monovalent radical of

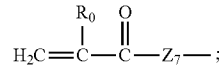

$E_3$ is a monovalent radical of

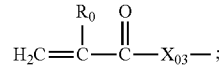

$E_4$ is a monovalent radical of

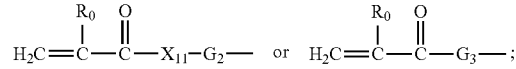

$L_1$ is a $C_2$-$C_8$ alkylene divalent radical or a divalent radical of -$L_1'$-$X_1$-$L_1''$-, $\mathrm{-(C_2H_4O)}_{q1}L_1''$, $\mathrm{-(C_2H_4O)}_{q1}\mathrm{CONH}\text{-}L_1''\text{-}$, -$L_1'$-NHCOO-$(C_2H_4O)_{q1}L_1''$-, —$CH_2$—CH(OH)—$CH_2$—$X_1'$—($C_2H_4O$)$_{q2}L_1''$-, -$L_1'$-$X_1'$—$CH_2$—CH(OH)—$CH_2$—O-$L_1''$-, or —($C_2H_4O$)$_{q1}CH_2$—CH(OH)—$CH_2$—O-$L_1''$-;

$L_1'$ is a $C_2$-$C_8$ alkylene divalent radical which has zero or one hydroxyl group;

$L_1''$ is $C_3$-$C_8$ alkylene divalent radical which has zero or one hydroxyl group;

$L_3$ is a divalent radical of -$L_3'$-O-($C_2H_4O$)$_{q2}$CONH—$R_2$-(NHCO—PE-CONH—$R_2$)$_{g1}$NHCO—(OC$_2$H$_4$)$_{q2}$O-$L_3'$- in which PE is a divalent radical of -(CH$_2$CH$_2$O)$_{q3}Z_0$—CF$_2$-(OCF$_2$)$_x$-(OCF$_2$-CF$_2$)$_y$OCF$_2$—$Z_0$-(OCH$_2$CH$_2$)$_{q3}$ or

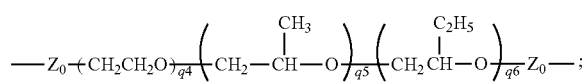

$L_3'$ is $C_3$-$C_8$ alkylene divalent radical;

$L_4$ is a divalent radical of —$C_2H_4$—NHCO—O—($C_2H_4O$)$_{q2}L_3'$-, —($C_2H_4O$)$_{q1}$CONH—$R_2$—NHCO—O—($C_2H_4O$)$_{q2}L_3'$-, —$R_3$—O—CONH—$R_2$—NHCO—O—($C_2H_4O$)$_{q2}L_3'$-, —$CH_2$—CH(OH)—$CH_2$—O—($C_2H_4O$)$_{q2}L_3'$-, or —($C_2H_4O$)$_{q2}L_3'$-;

$hpL_1$ is a divalent radical of

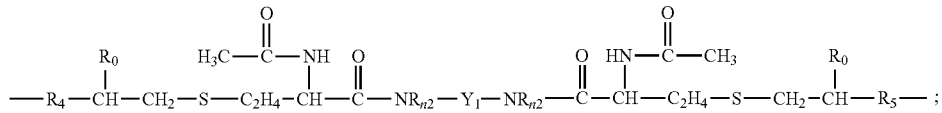

$hpL_2$ is a divalent radical of

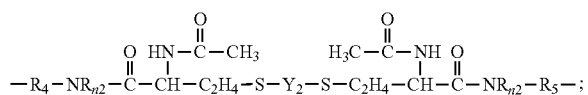

$hpL_3$ is a divalent radical of

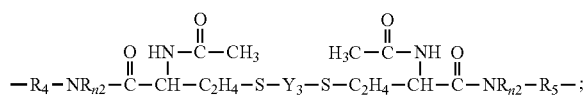

$hpL_4$ is a divalent radical of

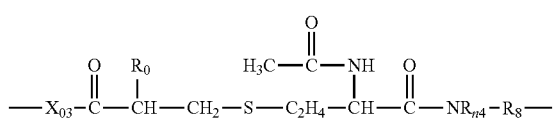

or

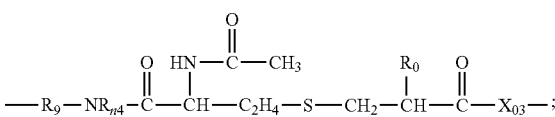

pOAlk is a divalent radical of —(EO)$_{e1}$(PO)$_{p1}$(BO)$_{b1}$— in which EO is an oxyethylene unit (—$CH_2CH_2O$—), PO is an oxypropylene unit

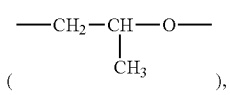

and BO is an oxybutylene unit

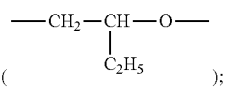

$M_0$ is $C_3$-$C_8$ alkylene divalent radical;
$M_1$ is a $C_4$-$C_{14}$ hydrocarbon divalent radical;
$M_2$ and $M_3$ independent of each other are a $C_1$-$C_6$ alkylene divalent radical;
$J_0$ is a $C_1$-$C_{12}$ hydrocarbon radical having 0 to 2 hydroxyl or carboxyl groups;

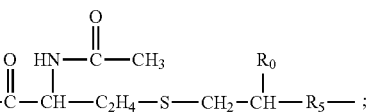

G1 is a direct bond, a $C_1$-$C_4$ alkylene divalent radical, or a bivalent radical of —$X_{04}$—($C_2H_4O$)$_{h1}$CONH-$M_1$-NHCO—O—($C_2H_4O$)$_{h2}M_0$-, —$X_{05}$-$M_2$-O—CONH-$M_1$-NHCO—O—($C_2H_4O$)$_{h2}M_0$-, —$X_{06}$—$CH_2$—CH(OH)—$CH_2$—O—($C_2H_4O$)$_{h2}M_0$-, $X_{07}$—($C_2H_4O$)$_{h2}M_0$-; —$X_{08}$-$M_3$-NHCOO—($C_2H_4O$)$_{h1}M_0$-, $X_{10}$—$CH_2$—CH(OH)—$CH_2$—$X_{09}$—($C_2H_4O$)$_{h2}M_0$-, —$X_{07}$-$M_3$-$X_{09}$—$CH_2$—CH(OH)—$CH_2$—O—$M_0$-, or —$X_{08}$—($C_2H_4O$)$_{h1}CH_2$—CH(OH)—$CH_2$—O-$M_0$-, in which $M_o$ is linked to Si atom while $X_{04}$ to $X_{10}$ are linked to the group of —$CH_2$— in formula (7) and at least one of $J_0$ and G1 in formula (7) comprises at least one moieties selected from the group consisting of hydroxyl groups, urethane linkage of —OCONH—, amino groups of —NHR°, amino linkages of —NH—, amide linkages of —CONH—, carboxyl groups, and combinations thereof;

$G_2$ is a $C_1$-$C_4$ alkylene divalent radical or a bivalent radical of —($C_2H_4O$)$_{h1}$CONH-$M_1$-NHCO—O—($C_2H_4O$)$_{h2}M_0$-, -$M_2$O—CONH-$M_{1\text{-}NHCO\text{-}O}$—($C_2H_4O$)$_{h2}M_0$-, —$CH_2$—CH(OH)—$CH_2$—O—($C_2H_4O$)$_{h2}M_0$-, —($C_2H_4O$)$_{h2}M_0$-; $M_3$-NHCOO—($C_2H_4O$)$_{h1}M_0$-, —$CH_2$—CH(OH)—$CH_2$—$X_{09}$—($C_2H_4O$)$_{h2}M_0$-, -$M_3$-$X_{09}$—$CH_2$—CH(OH)—$CH_2$—O-$M_0$-, or —($C_2H_4O$)$_{h1}CH_2$—CH(OH)—$CH_2$—O-$M_0$-;

$G_3$ is a divalent radical of

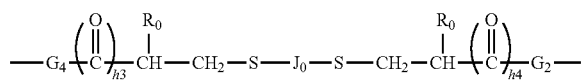

in which h3 and h4 independent of each other are 1 or 0;

G4 is a divalent radical of any one of (a) —$NR_3'$— in which $R_3'$ is hydrogen or $C_1$-$C_3$ alkyl, (b)

(c) —$NR_0$-$G_5$-$NR_0$— in which $G_5$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, and (d) —O-$G_6$-O— in which $G_6$ is a $C_1$-$C_6$ alkylene divalent radical, a divalent radical of

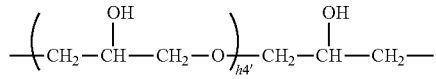

in which h4' is 1 or 2, a divalent radical of

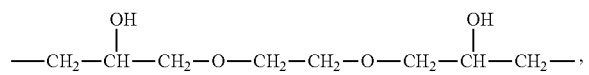

a divalent radical of —(—$CH_2$—$CH_2$—O—)$_{h5}$$CH_2$—$CH_2$— in which h5 is an integer of 1 to 5, a divalent radical of

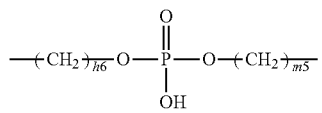

in which h6 is 2 or 3, or a substituted $C_3$-$C_8$ alkylene divalent radical having a hydroxyl group or phosphonyloxy group;

$Y_1$ is a $C_1$-$C_6$ alkylene divalent radical, 2-hydroxylpropylene divalent radical, 2-(phosphonyloxy)propylene divalent radical, 1,2-dihydroxyethylene divalent radical, a divalent radical of

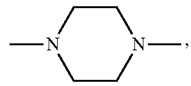

or a divalent radical of

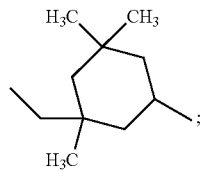

$Y_2$ is a divalent radical of

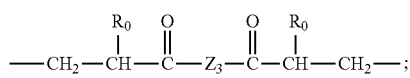

$Y_3$ is a divalent radical of

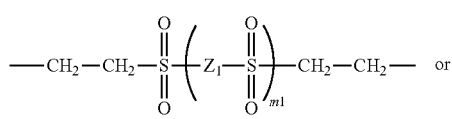

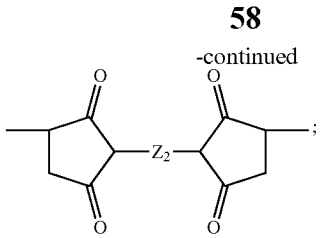

$Z_0$ is a direct bond or a $C_1$-$C_{12}$ alkylene divalent radical;

$Z_1$ is a $C_1$-$C_6$ alkylene divalent radical, a hydroxyl- or methoxy-substituted $C_1$-$C_6$ alkylene divalent radical, or a substituted or unsubstituted phenylene divalent radical, $Z_2$ is a $C_1$-$C_6$ alkylene divalent radical, a hydroxyl- or methoxy-substituted $C_1$-$C_6$ alkylene divalent radical, a dihydroxyl- or dimethoxy-substituted $C_2$-$C_6$ alkylene divalent radical, a divalent radical of —$C_2H_4$—(O—$C_2H_4$)$_{m2}$—, a divalent radical of —$Z_4$—S—S—$Z_4$—, a hydroxyl- or methoxy-substituted $C_1$-$C_6$ alkylene divalent radical, or a substituted or unsubstituted phenylene divalent radical, $Z_3$ is a divalent radical of any one of (a) —NR$_{n3}$—, (b)

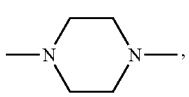

(c) —NR$_0$—$Z_5$—NR$_0$—, and (d) —O—$Z_6$—O—, $Z_4$ is a $C_1$-$C_6$ alkylene divalent radical, $Z_5$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, $Z_6$ is (a) a $C_1$-$C_6$ alkylene divalent radical, (b) a divalent radical of

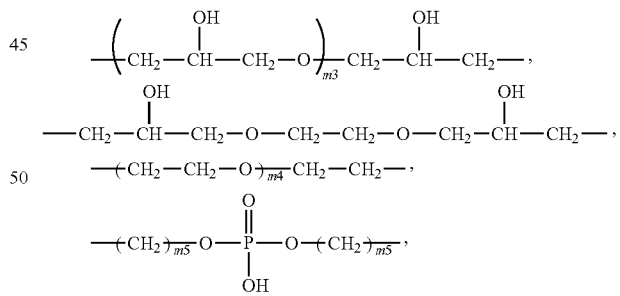

or (c) a substituted $C_3$-$C_8$ alkylene divalent radical having a hydroxyl group or phosphonyloxy group, $Z_7$ is a divalent radical of

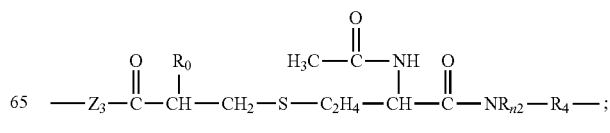

and $Z_8$ is a divalent radical of

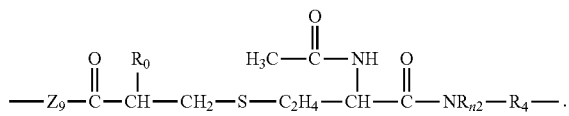

9. The method of claim 4, wherein said at least one hydrophilic vinylic monomer comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxyethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol) ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof; (5) an N-vinyl amide monomer selected from the group consisting of N-vinyl pyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) acrylic monomers having a $C_1$-$C_4$ alkoxyethoxy group selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a weight average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (10) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbohylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (11) allyl alcohol; (12)N-

2-hydroxyethyl vinyl carbamate; (13)N-carboxyvinyl-β-alanine (VINAL); (14)N-carboxyvinyl-α-alanine; (15) or combinations thereof.

10. The method of claim 9, wherein said at least one non-silicone vinylic crosslinker comprises ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, or combinations thereof.

11. The method of claim 10, wherein said at least one blending vinylic monomer comprises methyl methacrylate.

12. The method of claim 11, wherein said at least one UV-absorbing vinylic monomer and/or said at least one UV/HEVL-absorbing vinylic monomer comprise 2-[2'-hydroxy-5'-(2-methacryloxyethyl)phenyl)]-2H-benzotriazole and a UV/HEVL absorbing vinylic monomer selected from the group consisting of 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole, 2-{2'-Hydroxy-3'-tert-butyl-5'-[3'-methacryloyloxypropoxy]phenyl}-5-chloro-2H-benzotriazole, 242'-Hydroxy-3'-tert-butyl-5'-(3'-acryloyloxypropoxy)phenyl]-5-trifluoromethyl-2H-benzotriazole, and combinations thereof.

13. The method of claim 12, wherein the liquid extraction medium is: (a) water; (b) an aqueous solution; (c) a mixture of water with one or more organic solvents selected from the group consisting of 1,2-propylene glycol, a polyethyleneglycol having a number average molecular weight of about 400 Daltons or less, a $C_1$-$C_3$ alkyl alcohol, and combination thereof; or (d) one or more organic solvents selected from the group consisting of 1,2-propylene glycol, a polyethyleneglycol having a number average molecular weight of about 400 Daltons or less, a $C_1$-$C_3$ alkylalcohol, and combination thereof.

14. The method of claim 6, wherein said at least one non-silicone vinylic crosslinker comprises ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, or combinations thereof.

15. The method of claim 14, wherein said at least one blending vinylic monomer comprises methyl methacrylate.

16. The method of claim 15, wherein said at least one UV-absorbing vinylic monomer and/or said at least one UV/HEVL-absorbing vinylic monomer comprise 2-[2'-hydroxy-5'-(2-methacryloxyethyl)phenyl)]-2H-benzotriazole and a UV/HEVL absorbing vinylic monomer selected from the group consisting of 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole, 2-{2'-Hydroxy-3'-tert-butyl-5'-[3'-methacryloyloxypropoxy]phenyl}-5-chloro-2H-benzotriazole, 242'-Hydroxy-3'-tert-butyl-5'-(3'-acryloyloxypropoxy)phenyl]-5-trifluoromethyl-2H-benzotriazole, and combinations thereof.

17. The method of claim 16, wherein the liquid extraction medium is: (a) water; (b) an aqueous solution; (c) a mixture of water with one or more organic solvents selected from the group consisting of 1,2-propylene glycol, a polyethyleneglycol having a number average molecular weight of about 400 Daltons or less, a $C_1$-$C_3$ alkyl alcohol, and combination thereof; or (d) one or more organic solvents selected from the group consisting of 1,2-propylene glycol, a polyethyleneglycol having a number average molecular weight of about 400 Daltons or less, a $C_1$-$C_3$ alkylalcohol, and combination thereof.

18. The method of claim 7, wherein said at least one blending vinylic monomer comprises methyl methacrylate.

19. The method of claim 18, wherein said at least one UV-absorbing vinylic monomer and/or said at least one UV/HEVL-absorbing vinylic monomer comprise 2-[2'-hydroxy-5'-(2-methacryloxyethyl)phenyl)]-2H-benzotriazole and a UV/HEVL absorbing vinylic monomer selected from the group consisting of 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole, 2-{2'-Hydroxy-3'-tert-butyl-5'-[3'-methacryloyloxypropoxy]phenyl}-5-chloro-2H-benzotriazole, 2-[2'-Hydroxy-3'-tert-butyl-5'-(3'-acryloyloxypropoxy)phenyl]-5-trifluoromethyl-2H-benzotriazole, and combinations thereof.

20. The method of claim 19, wherein the liquid extraction medium is: (a) water; (b) an aqueous solution; (c) a mixture of water with one or more organic solvents selected from the group consisting of 1,2-propylene glycol, a polyethyleneglycol having a number average molecular weight of about 400 Daltons or less, a $C_1$-$C_3$ alkyl alcohol, and combination thereof; or (d) one or more organic solvents selected from the group consisting of 1,2-propylene glycol, a polyethyleneglycol having a number average molecular weight of about 400 Daltons or less, a $C_1$-$C_3$ alkylalcohol, and combination thereof.

* * * * *